United States Patent
Murch et al.

(10) Patent No.: US 10,493,666 B2
(45) Date of Patent: Dec. 3, 2019

(54) SYSTEM AND METHOD FOR FORMING COMPOSITE ARTICLES

(71) Applicant: Plasan Carbon Composites, Inc., Bennington, VT (US)

(72) Inventors: Robert W. Murch, Wixom, MI (US); Gary R. Lownsdale, Loudon, TN (US); Douglas L. Bartolotti, Grand Rapids, MI (US)

(73) Assignee: Plasan Carbon Composites, Inc., Bennington, VT (US)

( * ) Notice: Subject to any disclaimer, the term of this patent is extended or adjusted under 35 U.S.C. 154(b) by 354 days.

(21) Appl. No.: 15/292,228

(22) Filed: Oct. 13, 2016

(65) Prior Publication Data
US 2017/0297233 A1   Oct. 19, 2017

Related U.S. Application Data

(63) Continuation of application No. 14/232,723, filed as application No. PCT/US2012/048832 on Jul. 30, 2012, now abandoned.
(Continued)

(51) Int. Cl.
*B29C 35/04*   (2006.01)
*B29C 35/00*   (2006.01)
*B29C 35/02*   (2006.01)

(52) U.S. Cl.
CPC ........ *B29C 35/007* (2013.01); *B29C 35/0294* (2013.01)

(58) Field of Classification Search
CPC ..... B29C 35/041; B29C 35/04; B29C 35/007; B29C 35/0294; B29C 33/04; B29C 2035/1616; B29C 44/3419; B29C 45/7306
See application file for complete search history.

(56) References Cited

U.S. PATENT DOCUMENTS 2,620,635 A * 12/1952 Mautner .............. B29C 35/007
                                                                62/179
3,167,811 A    2/1965 Kraus et al.
(Continued)

FOREIGN PATENT DOCUMENTS

EP    2 095 801 A1    9/2009
EP    2 239 358 A1    10/2010
(Continued)

OTHER PUBLICATIONS

English language abstract for JP2013542170A extracted from espacenet.com database on Apr. 27, 2018, 1 page.
(Continued)

*Primary Examiner* — Matthew J Daniels
(74) *Attorney, Agent, or Firm* — Garder, Linn, Burkhart & Ondersma LLP

(57) ABSTRACT

A thermal system (20) for rapidly heating and cooling a mold surface (24) of a tool (26) comprises a heater-subsystem (40) in fluid communication with the tool (26). The heater-subsystem (40) comprises a heater (42), a tank (44), and a three-way valve (46). The tank (44) contains a mass of heated thermal fluid. The system (20) further comprises an exchanger-subsystem (49) in fluid communication with the heater-subsystem (40) and the tool (26). The exchanger-subsystem (49) comprises an exchanger (51) and a three-way valve (53). The system (20) further comprises a chiller-subsystem (48) in fluid communication with the exchanger-subsystem (49). The chiller-subsystem (48) comprises a chiller (50), a tank (52), and a three-way valve (54). The tank (52) contains a mass of cooled thermal fluid. A controller (56) can be used to control and/or instruct the subsystems (40,48,49). The system (20) and tool (26) can be used for forming a composite article (22), such as a carbon fiber
(Continued)

composite (CFC) article (22). A method utilizing the system (20) is also provided.

11 Claims, 15 Drawing Sheets

Related U.S. Application Data

(60) Provisional application No. 61/574,151, filed on Jul. 28, 2011.

(56) References Cited

U.S. PATENT DOCUMENTS

| | | | |
|---|---|---|---|
| 3,190,944 A * | 6/1965 | Moore | B29C 35/007 264/234 |
| 3,259,175 A * | 7/1966 | Kraus | B29C 35/007 165/267 |
| 3,334,383 A | 8/1967 | Irvine | |
| 3,525,098 A | 8/1970 | Vox | |
| 3,556,201 A | 1/1971 | Sander | |
| 3,860,382 A | 1/1975 | Spiller et al. | |
| 3,880,227 A | 4/1975 | Bauer | |
| 4,125,526 A | 11/1978 | McCready | |
| 4,593,056 A | 6/1986 | Qureshi et al. | |
| 5,209,889 A | 5/1993 | Brown et al. | |
| 5,328,979 A | 7/1994 | Harris et al. | |
| 5,354,195 A | 10/1994 | Dublinski et al. | |
| 5,360,671 A | 11/1994 | Harris | |
| 5,362,221 A | 11/1994 | Perkins | |
| 5,378,134 A | 1/1995 | Blot et al. | |
| 5,437,304 A | 8/1995 | Delcroix | |
| 6,991,756 B2 | 1/2006 | Saeki et al. | |
| 8,201,853 B2 | 6/2012 | Tiberghien et al. | |
| 8,210,859 B2 | 7/2012 | Tiberghien et al. | |
| 8,580,176 B2 | 11/2013 | Graham | |
| 8,633,327 B2 | 1/2014 | Gulyas et al. | |
| 2002/0025423 A1 | 2/2002 | Dreher et al. | |
| 2002/0052440 A1 | 5/2002 | Tochioka et al. | |
| 2003/0085491 A1 | 5/2003 | Saeki et al. | |
| 2007/0063061 A1* | 3/2007 | Nagasaka | B29C 35/007 236/68 B |
| 2008/0111280 A1 | 5/2008 | Choe et al. | |
| 2008/0203622 A1 | 8/2008 | Graham | |
| 2009/0194722 A1 | 8/2009 | Tiberghien et al. | |
| 2009/0218729 A1 | 9/2009 | Pelley | |
| 2009/0256290 A1 | 10/2009 | Wernestrom | |
| 2009/0322072 A1 | 12/2009 | Tiberghien et al. | |
| 2010/0013218 A1 | 1/2010 | Tiberghien et al. | |
| 2010/0243152 A1 | 9/2010 | Helfrich et al. | |
| 2010/0278951 A1 | 11/2010 | Tiberghien et al. | |
| 2011/0018258 A1 | 1/2011 | Tiberghien et al. | |
| 2011/0079306 A1 | 4/2011 | Tiberghien et al. | |
| 2011/0079742 A1 | 4/2011 | Tiberghien et al. | |
| 2012/0086202 A1 | 4/2012 | Tiberghien et al. | |
| 2012/0114973 A1 | 5/2012 | Jacobsen et al. | |
| 2013/0241100 A1 | 9/2013 | Lownsdale et al. | |
| 2014/0159267 A1 | 6/2014 | Murch et al. | |

FOREIGN PATENT DOCUMENTS

| | | |
|---|---|---|
| JP | S 62-208918 A | 9/1987 |
| JP | S 63-251207 A | 10/1988 |
| JP | H 01-125609 U | 8/1989 |
| JP | H 02-43011 A | 2/1990 |
| JP | H 03-51378 A | 3/1991 |
| JP | H 06-182792 A | 7/1994 |
| JP | H 06-226874 A | 8/1994 |
| JP | H 10-15944 A | 1/1998 |
| JP | 2000-176940 A | 6/2000 |
| JP | 2003-145542 A | 5/2003 |
| JP | 2004-527393 A | 9/2004 |
| JP | 2005-205876 A | 8/2005 |
| JP | 2006-159643 A | 6/2006 |
| JP | 2009-137075 A | 6/2009 |
| JP | 2010-528899 A | 8/2010 |
| JP | 2013542170 A | 11/2013 |
| WO | WO 2012/061768 A2 | 5/2012 |
| WO | WO 2012/075252 A1 | 6/2012 |

OTHER PUBLICATIONS

International Search Report for Application No. PCT/US2011/062836 dated Apr. 5, 2012, 7 pages.
International Search Report for Application No. PCT/US2012/048832 dated Nov. 23, 2012, 3 pages.
Advanced Composites Group, "ACG Shares Performance and Cutomization Finalist Award with Plasan for MTM57 Prepreg Application on GM's 2009 Corvette ZR1", Archived Automotive Sector News, Dec. 2008, retrieved from www.advanced-composites.co.uk/automotive_archived_news_index_2008_html on Nov. 19, 2011, 3 pages.
Advanced Composites Group, Ltd.,"ACG MTM57 Series Prepreg System", 2009, pp. 1-6.
Bodotex Composites, "Carbon Reinforcement Technical Datasheet", 2011, 1 page.
Campbell F C Ed—Campbell Flake C: "Chapter 6: Curing: It's a Matter of Time (t), Temperature (TO and Pressure (P)", Manufacturing Processes for Advanced Composites, Elsevier Advanced Technology, pp. 175-221, Jan. 1, 2004, XP002606673.
Illig, Adolf, "Varianten der Kuhlkreislaufe" In: Thermoformen in der Praxis, Jan. 1, 2008, p. 289, XP55041723.
Kitano, Akihiko et al., "The CFRP Automobile Body Project in Japan" Retrieved form the Internet: http://www.sampejapan.gr.jp/graphics/main/reikai/117, NED020061120_abstract.pdf [retrieved on Oct. 22, 2012], pp. 1-5 and 10, Nov. 20, 2006, XP55041754.
Marsh, George et al., "Quick Stepping to Fast Fluid Curing", Reinforced Plastics, Elsevier Advanced Technology, vol. 50, No. 7, Jul. 1, 2006, pp. 20-22 and 24, XP027984539.
Toray Carbon Fibers America, Inc., "Torayca T700S Technical Data Sheet No. CFA-005", downloaded in 2011 from www.toraycfa.com/pdfs/T700SDataSheet.pdf, 2 pages.
Wang, G. et al., "Research on a New Variotherm Injection Molding Technology and Its Application on the Molding of a Large LCD Panel", Polymer-Plastics Technology and Engineering, vol. 48 (2009), pp. 671-681.
Wang, G. et al., "Research of Thermal Response Simulation and Mold Structure Optimization for Rapid Heat Cycle Molding Processes, Respectively, With Steam Heating and Electric Heating, Materials and Design", vol. 31, 2010, pp. 382-395.
U.S. Appl. No. 61/418,521, filed Feb. 1, 2010, 20 pages.
U.S. Appl. No. 61/410,753, filed Nov. 5, 2010, 6 pages.
U.S. Appl. No. 61/495,661, filed Jun. 10, 2011, 2 pages.
English language abstract and machine-assisted English translation for EP 2 239 358 extracted from espacenet.com database on Jan. 14, 2016, 20 pages.
English language abstract and machine-assisted English language translation for JPS 62-208918 extracted from the PAJ database on Apr. 11, 2016, 11 pages.
English language abstract for JPS 63-251207 extracted from espacenet.com database on Feb. 17, 2016, and English language translation for JPS 63-251207 provided by ITOH International Patent Office on Feb. 15, 2016, 25 pages.
English language abstract for JPH 02-43011 extracted from espacenet.com database on Feb. 17, 2016, and English language translation for JPH 02-43011 provided by ITOH International Patent Office on Feb. 15, 2016, 20 pages.
English language abstract for JPH 03-51378 extracted from espacenet.com database on Jan. 11, 2016, 2 pages.
English language abstract and machine-assisted English language translation for JPH 06-226874 extracted from espacenet.com database on Jan. 11, 2016, 10 pages.
English language abstract for JPH 06-182792 extracted from espacenet.com database on Jan. 11, 2016, 2 pages.

(56) References Cited

OTHER PUBLICATIONS

English language abstract and machine-assisted English language translation for JPH 10-15944 extracted from espacenet.com database on Jan. 11, 2016, 30 pages.
English language abstract and machine-assisted English language translation for JP 2000-176940 extracted from espacenet.com database on Jan. 11, 2016, 12 pages.
English language abstract for JP 2003-145542 extracted from espacenet.com database on Apr. 11, 2016, 2 pages.
English language abstract for JP 2004-527393 extracted from espacenet.com database on Jan. 11, 2016, 2 pages.
English language abstract and machine-assisted English language translation for JP 2005-205876 extracted from espacenet.com database on Apr. 11, 2016, 35 pages.
English language abstract and machine-assisted English language translation for JP 2006-159643 extracted from espacenet.com database on Jan. 11, 2016, 23 pages.
English language abstract and machine-assisted English language translation for JP 2009-137075 extracted from the PAJ database on Apr. 11, 2016, 16 pages.
English language abstract for JP 2010-528899 extracted from espacenet.com database on Jan. 11, 2016, 1 page.

* cited by examiner

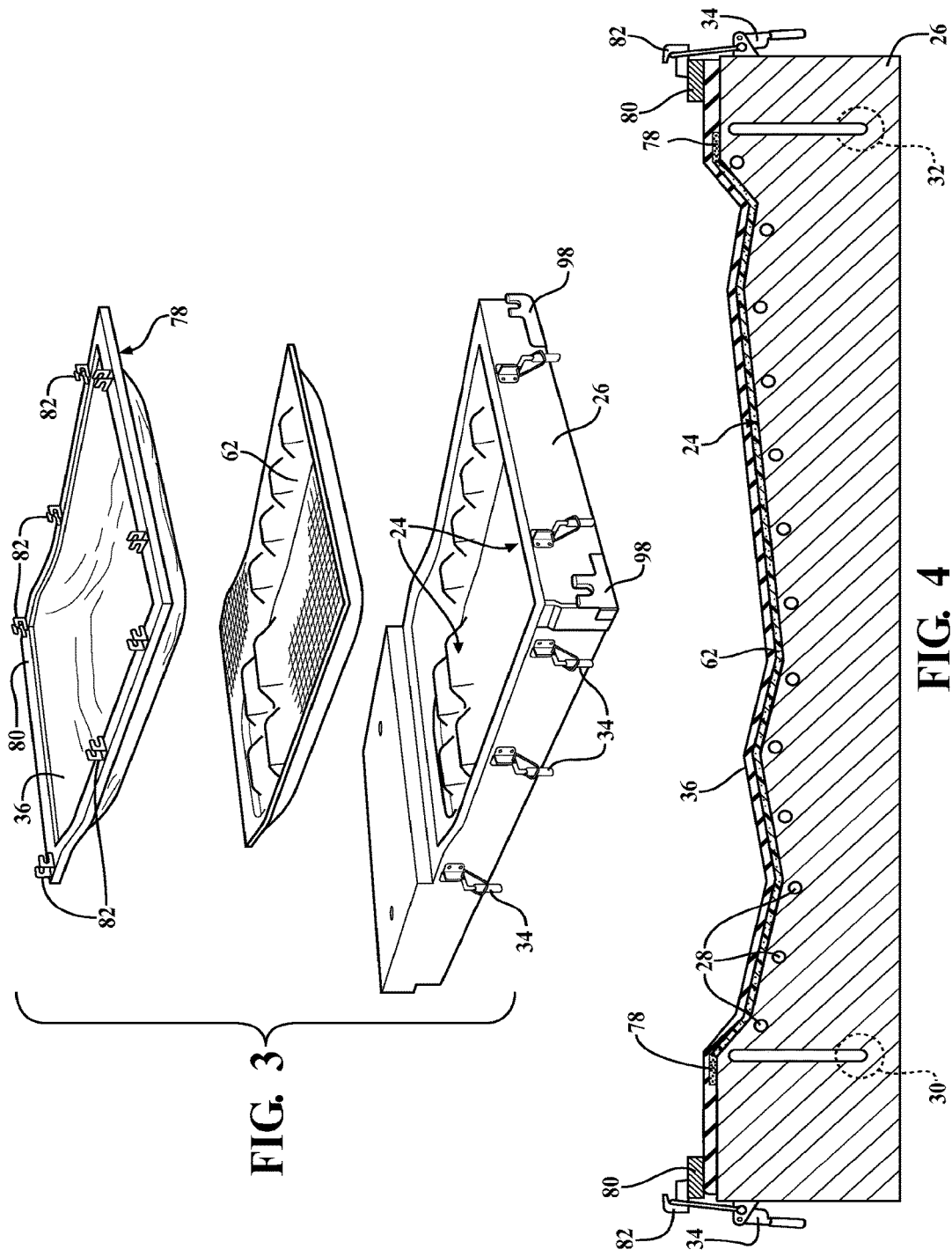

SYSTEM AND METHOD FOR FORMING COMPOSITE ARTICLES

CROSS REFERENCE TO RELATED APPLICATIONS

This application is a continuation of U.S. patent application Ser. No. 14/232,723, filed as application No. PCT/US12/48832 on Jul. 30, 2012 and entitled "SYSTEM AND METHOD FOR FORMING COMPOSITE ARTICLES", (now abandoned), which claims the benefit of U.S. Provisional Patent Application Ser. No. 61/574,151, filed on Jul. 28, 2011 and entitled "SYSTEM FOR FORMING COMPOSITE ARTICLES", which are both hereby incorporated herein by reference in their entireties.

FIELD OF THE INVENTION

The present invention generally relates to a system and method for forming composite articles, and more specifically to a thermal system and method for forming carbon fiber composite articles.

DESCRIPTION OF THE RELATED ART

Carbon fiber composite (CFC) articles typically comprise two or more layers of a carbon fiber mat comprising carbon fiber filaments, which are impregnated by a plastic resin, in a final cured state. Conventional methods for forming CFC articles include vacuum bag molding, pressure molding, Virtual Engineered Composites (VEC) molding, autoclave molding, and resin transfer molding (RTM). Newer automotive industry regulations, including the Corporate Average Fuel Economy (CAFE), Head Impact Characteristic (HIC), and Pedestrian Protection, represent a challenge to conventional materials used in automobiles, such as steel. Relative to steel, CFC articles include an excellent combination of physical properties including strength, weight, and energy absorption. As such, CFC articles are able to meet these newer requirements, such as requirements for mass reduction and energy absorption.

Unfortunately, a major issue with conventional CFC articles is the amount of time it takes to manufacture CFC articles relative to conventional articles, such as those made out of steel. In addition, it can be time consuming and difficult to achieve CFC articles with aesthetically pleasing surfaces, such as "Class A" surfaces. As such, there remains an opportunity to provide improved methods and systems for forming CFC articles.

SUMMARY OF THE INVENTION AND ADVANTAGES

The present invention provides a thermal system for rapidly heating and cooling a mold surface of a tool. The thermal system comprises a heater-subsystem in fluid communication with the tool. The heater-subsystem comprises a heater for heating a first thermal fluid, a tank in fluid communication with the heater and containing a mass of heated first thermal fluid, and a three-way valve. The three-way valve is in fluid communication i) between the tank and the heater for re-circulating the first thermal fluid from the tank to the heater and ii) between the tank and the tool for directing the first thermal fluid from the tank to the tool. The thermal system further comprises an exchanger-subsystem in fluid communication with the heater-subsystem and the tool. The exchanger-subsystem comprises an exchanger for cooling the first thermal fluid returning from the tool, and a three-way valve. The three-way valve is in fluid communication i) between the exchanger and the heater-subsystem for sending the first thermal fluid from the tool back to the heater-subsystem and ii) between the exchanger and the tool for directing the first thermal fluid from the tool to the exchanger. The thermal system further comprises a chiller-subsystem in fluid communication with the exchanger-subsystem. The chiller-subsystem comprises a chiller to cool a second thermal fluid, a tank in fluid communication with the chiller and containing a mass of cooled second thermal fluid, and a three-way valve. The three-way valve is in fluid communication i) between the tank and the chiller for re-circulating the second thermal fluid from the tank to the chiller and ii) between the tank and the exchanger-subsystem for directing the second thermal fluid from the tank to the exchanger. The tool can be used for forming a composite article, such as a carbon fiber composite article.

The present invention also provides a method of rapidly heating and cooling the mold surface of the tool. The method comprises the steps of providing the heater-subsystem, providing the exchanger-subsystem, providing the chiller-subsystem, and providing a controller. The controller is in communication with the tool and the subsystems for instructing the subsystems. The method further comprises the step of directing the mass of heated first thermal fluid from the tank of the heater-subsystem to the tool via the controller to heat the mold surface of the tool from a first temperature ($T_1$) to a second temperature ($T_2$) within a first period of time ($Tt_1$). The method further comprises the step of directing the mass of heated first thermal fluid from the tank of the heater-subsystem to the mold surface of the tool via the controller to maintain the mold surface at $T_2$ for a second period of time ($Tt_2$). The method further comprises the step of directing the mass of cooled second thermal fluid from the tank of the chiller-subsystem to the exchanger-subsystem via the controller to cool the first thermal fluid returning from the tool from $T_2$ to a third temperature ($T_3$) within a third period of time ($Tt_3$). The mold surface of the tool heats at a rate of greater than about 60° F. (~33° C.) per minute and cools at a rate of greater than about 40° F. (~22° C.) per minute. $Tt_1+Tt_2+Tt_3$ is no greater than about 20 minutes.

The present invention provides various benefits over conventional systems and methods for forming composite articles. For example, conventional methods, such as autoclaving, generally have cycle times that are well over an hour, typically cycle times of 75 minutes or longer. Such cycle times are the times in which the composite articles are formed within the autoclave (e.g. during cure of a resin).

In a typical autoclave process, preforms are disposed on tools, the tools are loaded into the autoclave, vacuum bags (or other vacuum means) are attached to the tools, the autoclave is closed, vacuum is applied, and the autoclave is heated and pressurized with nitrogen gas ($N_2$) for an extended period of time, e.g. 75+ minutes, to form the composite articles. $N_2$ is generally required to prevent flash fires in the autoclave due to exotherms. Additional time associated with loading, closing, opening, and unloading the autoclave further decreases output.

The autoclave takes a long time to heat and requires the use of $N_2$ for safety reasons. As such, energy costs associated with the autoclave tends to be high. In order to increase output of composite articles, autoclaves tend to be large in size, thereby having a large footprint. Such sizing of the autoclave also requires a large number of heavy and expensive tools, further adding to capital and manufacturing costs.

Autoclaves are also prone to making scrap parts. For example, if vacuum fails (or is interrupted) on one (or more) of the tools while in the autoclave, the composite article will cure in an improper configuration, e.g. a non-consolidated form. The vacuum cannot be reestablished until after the cure cycle is complete, which is too late to save the composite article. As such, the composite article(s) with vacuum problems must be scrapped after being removed from the autoclave.

Composite articles formed in autoclaves also tend to suffer from surfaces blemishes, such as pits of various location, diameter and depth. Such surface blemishes must be removed during finishing steps of the composite article, such as by filling and sanding, further adding to manufacturing costs.

The thermal system and method of the present invention provide one or more benefits over the prior art. The present invention provides for excellent temperature control relative to conventional autoclaving systems and methods. The present invention can provide reduced cycle times relative to autoclave cycles, which provides for increased output. Reduced energy costs may also be appreciated. A reduced footprint may be provided by the thermal system relative to large autoclaves. The same or similar chemistries and/or materials generally used for conventional autoclave methods, e.g. resins, may generally be used with the present invention, therefore not requiring chemistry or material redesign.

The present invention generally provides composite articles which have excellent surface properties that generally match those of carbon composite articles formed in an autoclave. For example, surface blemishes (e.g. pits) are generally reduced in number and/or severity. In addition or alternatively, the present invention generally provides composite articles which have excellent mechanical properties that match or exceed those of carbon composite articles formed in an autoclave.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a partially exploded perspective view of the tool, a vacuum canopy, and a preform of a composite article disposed between the tool and vacuum canopy;

FIG. 4 is a cross-sectional end-view of the tool having a mold surface and tubing, the vacuum canopy attached to the tool, and the preform of the composite article disposed between the mold surface and vacuum canopy;

DETAILED DESCRIPTION OF THE INVENTION

Figure 1:
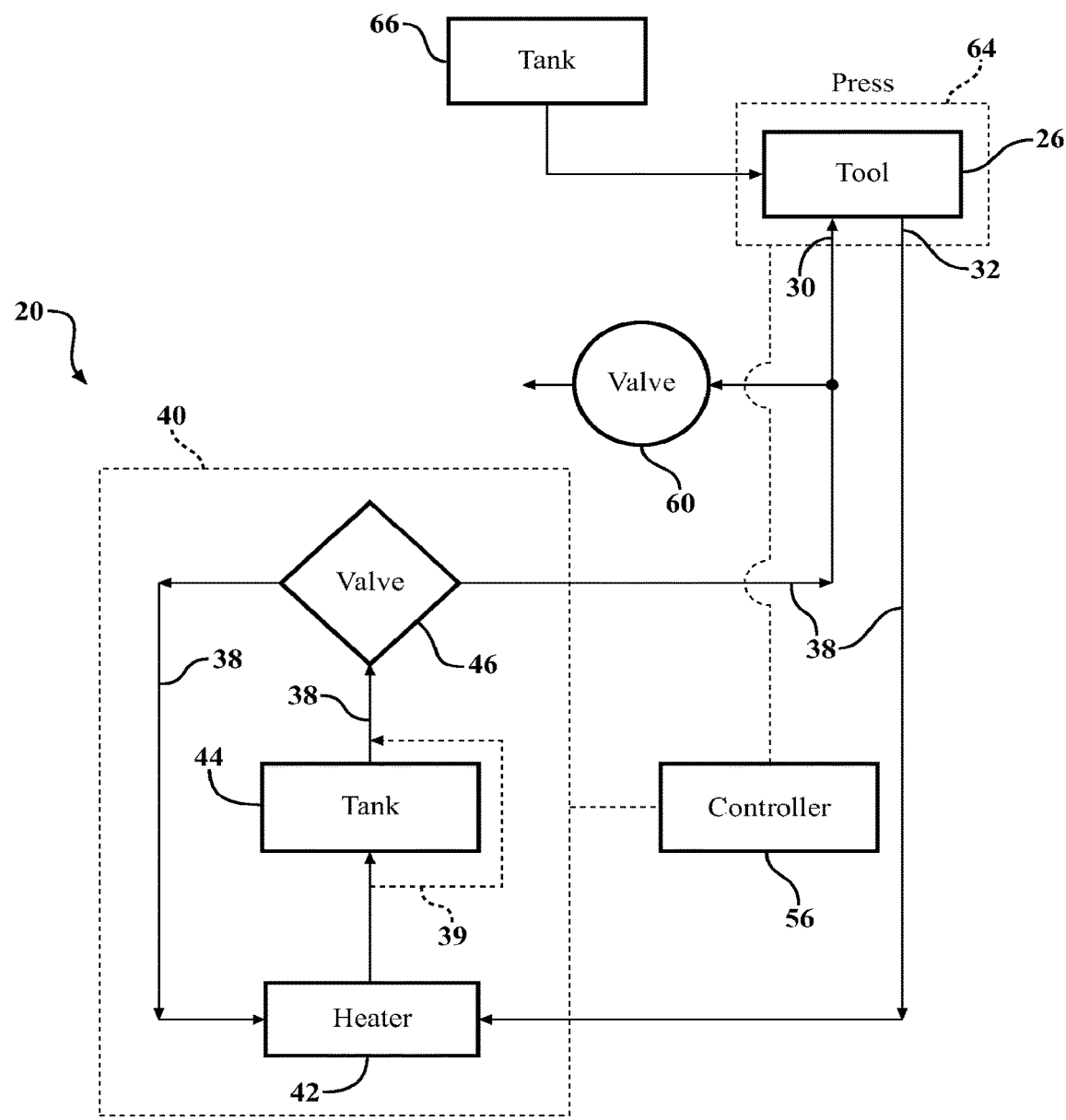
FIG. 1 is a schematic view of a thermal system having a heater-subsystem, a valve, a controller, a press, a tool disposed within the press, and a pressure tank.

Referring to the Figures, wherein like numerals indicate like parts throughout the several views, a thermal system is generally shown at 20. The thermal system 20 is hereinafter simply referred to as the system 20. The system 20 can be used for forming various types of articles. The system 20 is useful for forming composite articles 22, such as carbon fiber reinforced plastics 22 or carbon fiber composite (CFC) articles 22. CFC articles 22 are useful in many industries, such as in the automotive, marine, military defense, aeronautical, aerospace, and medical equipment industries.

The system 20 is especially useful for forming "Class A" CFC body panels 22 across entire vehicle platforms. Examples of body panels 22 and related parts include hoods, fenders, roofs, rockers, splitters, roof bows, dive planes, wings, mirror caps, deflectors, etc. Further examples of CFC articles 22 include deck-lids, battery applications, control arms, bumpers, cradles/sub-frames, and other structural components. The system 20 is not limited to forming any particular type of composite article 22, or composite articles 22 for a particular industry, and such composite articles 22 can be of various sizes, shapes, and use. The composite articles 22 are described further below.

The system 20 is useful for heating and cooling a mold surface 24 of a tool 26. Specifically, the system 20 is useful for heating and cooling a fluid, with the fluid used for directly (or nearly directly) heating and cooling the mold surface 24 of the tool 26. The system 20 can be used in combination with or separate from the methods of the present invention. The invention methods are described further below, and can be used in combination with or separate from the system 20.

The tool 26 can be a portion of a mold (e.g. a two-piece mold) where the tool 26 is a top mold and another tool is a bottom mold, or vice versa. The tool 26 is typically a one-piece mold 26 (e.g. an open mold). The system 20 is generally associated with at least one type of the tool 26, but may be associated with two or more different types of tools 26, which can be the same as or different from each other. The tool 26 can be of various types, albeit possibly being modified for communicating with the system 20.

In certain embodiments, the tool 26 is of the type (or similar to the type) generally used in conventional autoclaves. However, the system 20 is not typically associated with an autoclave. In other words, the system 20 is generally free of an autoclave, as are the invention methods. In one embodiment, the tool 26 is of the type generally used for vacuum molding (or forming). In another embodiment, the tool 26 is of the type generally used for resin transfer molding (RTM). It is to be appreciated that other types of tools 26 can also be used.

The mold surface 24 and the tool 26 may be unitary, i.e., a single body. In certain embodiments, the mold surface 24 and the tool 26 are separate pieces joined together, e.g. by fasteners, by welding, etc. As such, different mold surfaces 24 may be used with different tools 26 or vice versa. This allows for interchangeability between different mold surfaces 24 and/or different tools 26 for forming different types of composite articles 22.

The mold surface 24 of the tool 26 can be configured to have various shapes. Typically, the mold surface 24 is configured in a shape corresponding to a particular composite article 22 being made, e.g. a hood, a fender, a spoiler, etc. The mold surface 24 is not limited to any particular shape.

The mold surface 24 of the tool 26 is typically formed from a metallic material, which is useful for heat transfer, such as nickel, steel, etc. In certain embodiments, the mold surface 24 comprises a nickel alloy. 22. In these embodiments, the mold surface 24 is generally rigid and inflexible (which is different from a rubber or "bladder" type mold surface). Metallic mold surfaces 24 generally have a high thermal conductivity, which allows for rapid heating and cooling of the mold surface 24. This is especially true when utilized along with the system 20. The mold surface 24 can be of various thicknesses, typically of from about 5 to about 20, from about 7.5 to about 15, or from about 10 to about 12.5, mm. Suitable mold surfaces 24 are commercially available from a variety of suppliers. Specific examples of mold surfaces 24 include those commercially available from Weber Manufacturing Team of Midland, Ontario, Canada, such as nickel shell mold surfaces 24; Visioneering Inc. of Fraser, Mich.; and Models & Tools Inc. of Troy, Mich., such as mold surfaces 24 formed from Invar (or "64FeNi").

Referring to FIG. 4, the tool 26 typically includes tubing 28 for communicating the fluid. The tubing 28 includes at least one input 30 for communicating fluid to the tubing 28 and at least one outlet 32 for communicating fluid from the tubing 28. The tubing 28 is proximal or directly in contact with the mold surface 24 to expedite heat transfer between the tubing 28 and the mold surface 24. The tubing 28 is useful for direct (rather than indirect) heating or cooling of the mold surface 24. The tubing 28 may be formed into the tool 26 itself (such as by boring within the tool 26), or attached within the tool 26 proximal the mold surface 24, either to the tool 26 and/or to the mold surface 24. The tubing 28 can be attached (e.g. to the mold surface 24) in various fashions, such as by welding, fasteners, etc.

The tubing 28 can be arranged in various patterns and may be of equal or varying diameters. For example, if the mold surface 24 is complex in shape, a portion of the tubing 28 can be concentrated in more critical areas of the mold surface 24 to ensure proper heating and cooling of those areas. As alluded to above, the mold surface 24 may be of various configurations, and can be substantially planar, three-dimensional, or a combination of shapes. The tubing 28 can be configured likewise to provide for direct heating of the mold surface 24. The tool 26 may have one or more fasteners 34, e.g. clamps 34, for attaching a vacuum canopy 36 to the tool 26. Various types of fasteners 34 may be employed. The vacuum canopy 36 is described further below. In other embodiments, a conventional vacuum bag (not shown) can be utilized.

The tubing 28 of the tool 26 is connected to piping 38 of the system 20 for communicating the fluid to and from the tool 26 and to and from the system 20 for heating and cooling the mold surface 24. Various types of piping 38 can be employed. The piping 38 should be capable of handling the temperatures and pressures present in the system 20. The piping 38 can be of various diameters. For example, the piping 38 can have a diameter of from about 0.5 to about 4, about 0.75 to about 3, about 1 to about 2, or about 2, inches (or about 1.3 to about 10, about 1.9 to about 7.6, about 2.5 to about 5, or about 5, cm), outer diameter (OD).

The tubing 28 may have more than one input 30 and output 32. For example, there may be two or more sets of discrete tubing 28 arrangements within the tool 26 for better control of heating and cooling of the mold surface 24. Suitable tools 26 are commercially available from a variety of suppliers. Specific examples of tools 26 include those commercially available from Weber Manufacturing Team, such as nickel shell tooling.

The fluid carried within the system 20 is typically a heat transfer fluid, which may also be referred to as a thermal fluid. Various types of fluids can be employed. Typically, the fluid used within at least the tool 26 is an oil, e.g. thermal oil, (rather than water) due to the temperatures reached in the system 20. Water may be used elsewhere in the system 20, and combinations of thermal oil and water may be used in certain embodiments. Suitable fluids are commercially available from a variety of suppliers. Specific examples of fluids include those commercially available from Mokon of Buffalo, N.Y., including DELF450 and DELF600. Further examples of fluids include those commercially available from Multitherm of Malvern, Pa., including PG-1 and IG-4; from Paratherm Corp. of West Conshohocken, Pa., including NF and HE; from Petro-Canada Products, including Calflo™ FG and Calflo™ HTF; from Solutia Inc. of St. Louis, Mo., including Therminol® 66; and from Duratherm of Lewiston, N.Y., including Duratherm 450, Duratherm 600, and Duratherm Lite (or LT). The fluid should be capable of handling the temperatures of the system 20, and may include a blend of two or more different fluids. Typically, the system 20 is closed-loop; however, at times, the system 20 may have some amount of fluid added thereto or withdrawn therefrom.

Referring to FIG. 1, which illustrates one embodiment of the system 20, the system 20 comprises a heater-subsystem 40. The heater-subsystem 40 is in fluid communication with the tool 26. The heater-subsystem 40 is useful for heating the mold surface 24 of the tool 26. In certain embodiments, the heater-subsystem 40 can also be used for cooling the mold surface 24 of the tool 26.

The heater-subsystem 40 comprises a heater 42. The heater 42 is useful for heating the fluid within the system 20. Various types of heaters 42 can be employed. The heater 42 should be capable of heating the fluid to temperatures of at least about 3° F. (~−16° C.) to about 350° F. (~177° C.), or upwards of about 600° F. (~315° C.) to about 650° F. (~343° C.). Generally, the hotter the fluid coming into the tool 26, the quicker the mold surface 24 heats. The heater 42 should also be capable of delivering various outputs of the fluid. Examples of suitable outputs are from about 10 to about 120, from about 20 to about 100, from about 40 to about 90, or about 60, gallons per minute (gpm) (or about 38 to about 454, about 76 to about 379, about 151 to about 341, or about 227, liters per minute). Suitable heaters 42 are commercially available from a variety of suppliers. Specific examples of heaters 42 include those commercially available from Mokon, including the HTF Series, e.g. the HTF 500 Series, the HTF 600 Series, the HTF HF-2 Series, and the ST Series, heaters. Gas fired heaters, such as those commercially available from Fulton Boiler Works, Inc. of Pulaski, N.Y., can also be used, e.g. a Fulton FT-0320-C Thermal Fluid Heater. As used herein, a tilde character (~) is meant to represent an approximation based, for example, on unit conversion from US to SI units.

The heater-subsystem 40 further comprises a tank 44. The tank 44 of the heater-subsystem 40 is useful for containing a mass of heated fluid. The tank 44 of the heater-subsystem 40 serves as a heat buffer in the system 20, as described further below. The tank 44 of the heater-subsystem 40 is in fluid communication with the heater 42. Various types of tanks can be employed as the tank 44 of the heater-subsystem 40. The tank 44 of the heater-subsystem 40 should be capable of holding fluid at temperatures of at least about 300° F. (~157° C.) to about 350° F. (~177° C.), and upwards of about 600° F. (~315° C.) to about 650° F. (~343° C.). Typically, the tank 44 of the heater-subsystem 40 should be rated for more than the highest temperature output of the heater 42. In certain embodiments, the heater-subsystem 40 comprises two of more tanks (not shown). For example, the mass of fluid contained in one tank 44 may be at a different temperature than that of another tank 44. This may be useful for buffering the system 20 with masses of heated fluid at different temperatures. The tank 44 is typically separate from the heater 42, i.e., the tank 44 is distinguishable from an "internal" tank of the heater 42, if present.

Generally, the tank 44 of the heater-subsystem 40 is insulated, either itself, and/or with a supplemental layer of insulation, to prevent cooling of the mass of heated fluid contained therein by the ambient environment. Various types of insulation means can be employed. For example, the tank 44 of the heater-subsystem 40 can be wrapped with an insulated jacket. Piping 38 of the system 20, or portions thereof, should also be wrapped or covered for purposes of insulation and safety. For example, the piping 38 running from the heater-subsystem 40 to the tool 26 can be insulated to prevent heat loss, burns, fires, etc.

The tank 44 of the heater-subsystem 40 can be of various sizes and shapes. It may be useful to reduce the surface area to volume ratio (SA:V) of the tank 44 of the heater-subsystem 40 to reduce heat loss; however, this is not required. The tank 44 of the heater-subsystem 40 should be sized to hold of from about 50 to about 250, from about 100 to about 225, from about 100 to about 200, or from about 100 to about 150, gallons of the fluid (or about 189 to about 946, from about 378 to about 852, from about 378 to about 757, or from about 378 to about 568, liters of the fluid). Generally, a larger size tank 44 provides for a greater heat buffer in the system 20. Reference to the mass of heated fluid associated with the tank 44 of the heater-subsystem 40 may refer to a portion to an entirety of the heated fluid contained within the tank 44 at a given instance. The masses of fluid described herein may also be referred to as stored (thermal) energy masses.

The heater-subsystem 40 further comprises a valve 46 in fluid communication between the tank 44 of the heater-subsystem 40 and the heater 42. Various types of valves 46 can be employed. Typically, the valve 46 is a three-way valve 46. The three-way valve 46 of the heater-subsystem 40 is useful for re-circulating the fluid between the tank 44 of the heater-subsystem 40 and the heater 42. This arrangement is useful for initially forming, maintaining, and/or recharging the mass of heated fluid in the tank 44 of the heater-subsystem 40. For example, once a portion (or all) of the mass of heated fluid is fed to the tool 26, fluid returning from the tool 26 can be fed to the heater 42 and then to the tank 44 of the heater-subsystem 40 to maintain or recharge the mass of heated fluid. The heated fluid may then be held or re-circulated in one or more passes between the heater 42 and the tank 44 of the heater-subsystem 40 to further increase or maintain temperature of the mass of heated fluid. This is also useful if the heater 42 can't keep up with demands of the tool 26 and/or the system 20, where the mass of heated fluid serves as a buffer for the heater 42 to catch-up or recover. This is also useful for maintaining a near steady-state temperature of the fluid within the heater-subsystem 40 to meet ongoing demands of the tool 26 and the system 20.

The three-way valve 46 of the heater-subsystem 40 is also in fluid communication between the tank 44 of the heater-subsystem 40 and the tool 26. As such, the three-way valve 46 of the heater-subsystem 40 is also useful for directing the fluid from the tank 44 of the heater-subsystem 40 to the tool 26. This is especially useful for rapidly heating the mold surface 24 of the tool 26 as further described below. For example, the mass of heated fluid (or a portion thereof) can be fed to the tool 26 to rapidly heat the mold surface 24. The mass of heated fluid provided by the tank 44 of the heater-subsystem 40 provides for a rapid change in temperature relative to what the heater 42 could achieve on its own by providing only heated fluid on demand. For example, the heater 42 may be burdened during ramping up of the mold surface 24 temperature and will take time to recover. The mass of heated fluid provides for a drastic change in temperature in a very short period of time, i.e., a maximum ΔT in the mold surface 24, without putting the entire heating burden on the heater 42.

Figure 18:
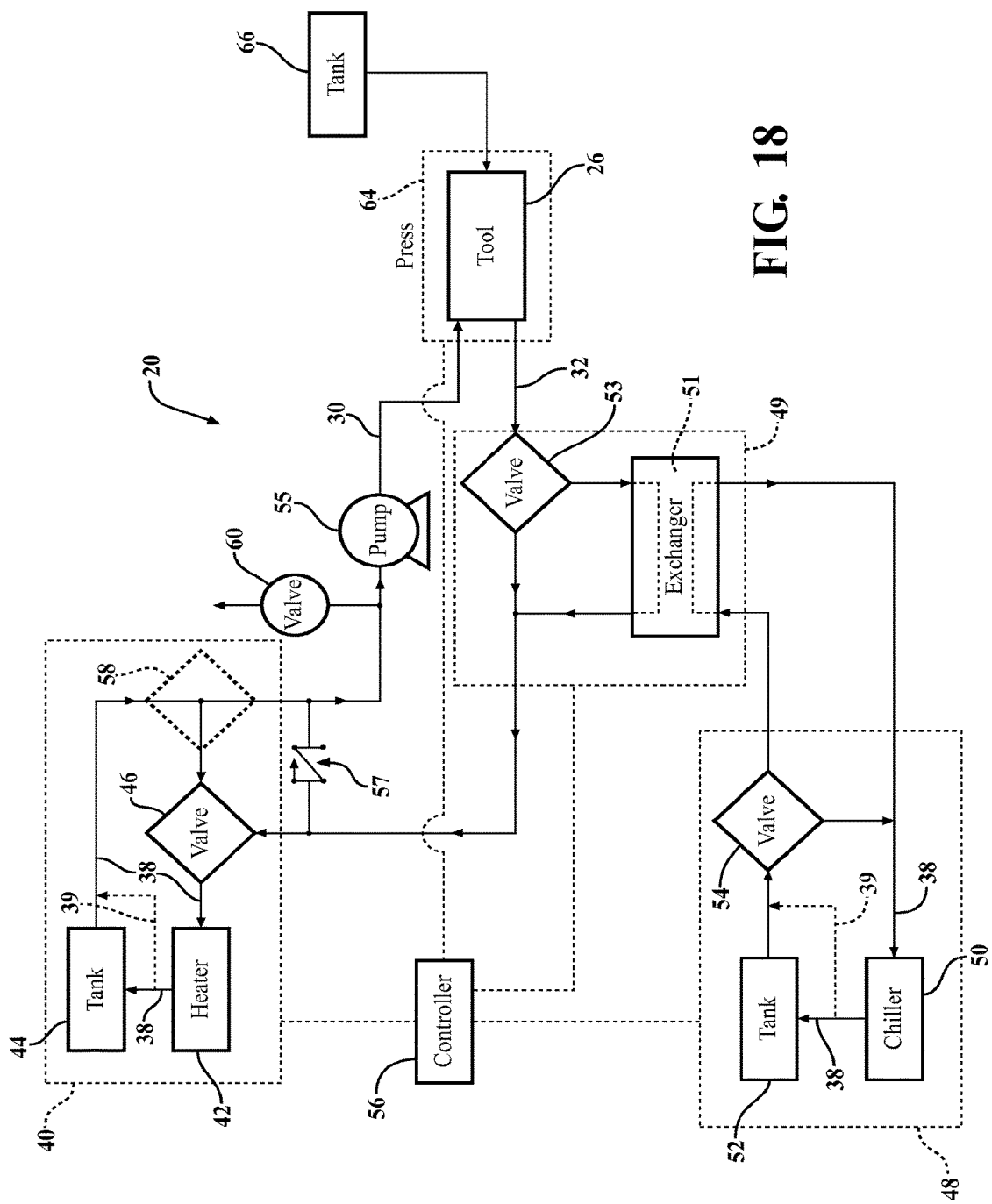
FIG. 18 is a schematic view of another embodiment of the thermal system having a heater-subsystem, a chiller-subsystem, an exchanger-subsystem, valves, the controller, the press, the tool disposed within the press, and the pressure tank.

Referring to FIG. 18, another embodiment of the system 20 is shown. The three-way valve 46 of the heater-subsystem 40 is in fluid communication i) between the tank 44 and the heater 42 for re-circulating a first thermal fluid from the tank 44 to the heater 42 and ii) between the tank 44 and the tool 26 for directing the first thermal fluid from the tank 44 to the tool 26. Optionally, the heater-subsystem 40 may include a tank bypass line 39 in this or other embodiments.

Figure 2:
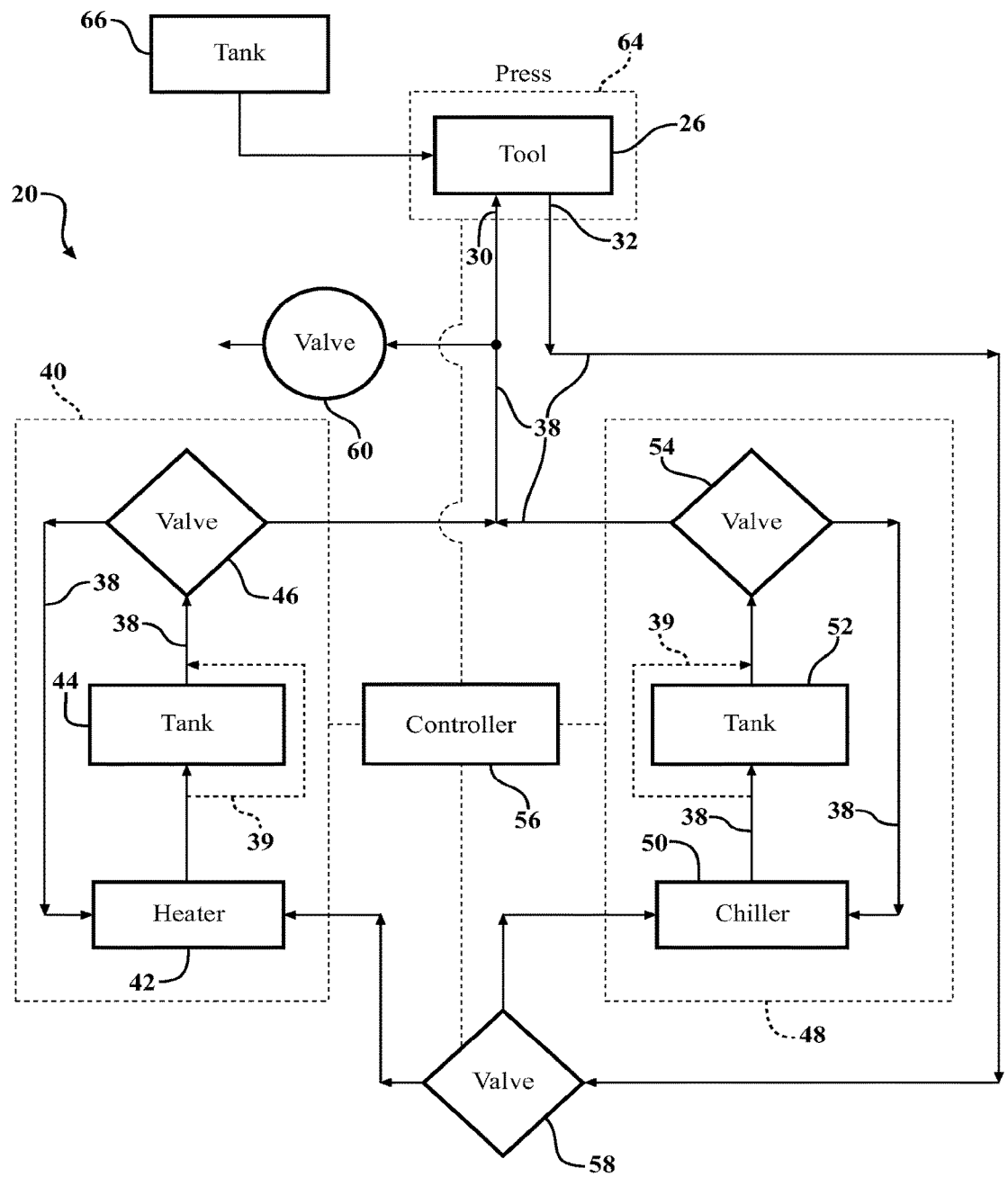
FIG. 2 is a schematic view of another embodiment of the thermal system having a heater-subsystem, a chiller-subsystem, valves, the controller, the press, the tool disposed within the press, and the pressure tank.

Referring to FIG. 2, a related embodiment of the system 20 further comprises a chiller-subsystem 48. As such, in certain embodiments, the system 20 comprises the heater- and chiller-subsystems 40,48. In this embodiment, the chiller-subsystem 48 is in fluid communication with the tool 26. The chiller-subsystem 48 is useful for cooling the mold surface 24 of the tool 26. In embodiments where the heater-subsystem 40 may be used for cooling the mold surface 24 of the tool 26, the chiller-subsystem 48 can also be used for further cooling the mold surface 24. In other certain embodiments, the heater-subsystem 40 is used only for heating the mold surface 24, and the chiller-subsystem 48 is used only for cooling the mold surface 24. Other embodiments of the system 20 are described below, where the chiller-subsystem 48 is used in another location of the system 20. In certain embodiments, the subsystems 40,48 are separate from each other; however, in other embodiments, the subsystems 40,48 are in fluid communication with each other, i.e., they share the fluid of the system 20.

The chiller-subsystem 48 comprises a chiller 50. The chiller 50 is useful for cooling the fluid within the system 20. Various types of chillers 50 can be employed. The chiller 50 should be capable of cooling the fluid to temperatures of at least about 50° F. (~10° C.) to about 80° F. (~27° C.), and downwards of about −10° F. (~−23° C.) to about 20° F. (~−7° C.). The chiller 50 should also be capable of delivering various outputs of fluid, such as from about 10 to about 150, from about 20 to about 125, from about 30 to about 100, from about 40 to about 75, ton chilling (where 1 ton chilling is about 12,000 BTUs per hour). Suitable chillers 50 are commercially available from a variety of suppliers. Specific examples of chillers 50 include those commercially available from Mokon, including the Iceman Series, e.g. the Iceman SC Series, the Iceman LT Series, the Iceman Dual Circuit, and the Iceman Full Range.

The chiller-subsystem 48 further comprises a tank 52. The tank 52 of the chiller-subsystem 48 is useful for containing a mass of cooled fluid. The tank 52 of the chiller-subsystem 48 is in fluid communication with the chiller 50. Various types of tanks can be employed as the tank 52 of the chiller-subsystem 48. The tank 52 of the chiller-subsystem 48 should be able to hold fluid at temperatures of about −30° F. (~−34° C.) to about −10° F. (~−23° C.), or upwards of about 20° F. (~−7° C.) to about 50° F. (~10° C.). Typically, the tank 52 of the chiller-subsystem 48 should be rated for less than the lowest temperature output of the chiller 50. In certain embodiments, the chiller-subsystem 48 comprises two of more tanks (not shown). For example, the mass of fluid contained in one tank 52 may be at a different temperature than that of another tank 52. This may be useful for buffering the system 20 with masses of cooled fluid at different temperatures.

Generally, the tank 52 of the chiller-subsystem 48 should be insulated, either itself, and/or with a supplemental layer of insulation, to prevent heating of the mass of cooled fluid contained therein by the ambient environment. Various types of insulation means can be employed as like described above with the tank 44 of the heater-subsystem 40.

The tank 52 of the chiller-subsystem 48 can be of various sizes and shapes. It may be useful to reduce the SA:V of the tank 52 of the chiller-subsystem 48 to reduce heat gain; however, this is not required. The tank 52 of the chiller-subsystem 48 should be of a size to hold of from about 50 to about 200, from about 75 to about 150, or from about 100 to about 125, gallons of the fluid (or about 189 to about 946, from about 378 to about 852, from about 378 to about 757, or from about 378 to about 568, liters of the fluid). Generally, a larger size tank 52 provides for a greater cooling buffer in the system 20. Reference to the mass of cooled fluid associated with the tank 52 of the chiller-subsystem 48 may refer to a portion to an entirety of the cooled fluid contained in the tank 52 at a given instance. The tank 52 is typically separate from the chiller 50, i.e., the tank 52 is distinguishable from an "internal" tank of the chiller 50, if present.

The chiller-subsystem 48 further comprises a valve 54 in fluid communication between the tank 52 of the chiller-subsystem 48 and the chiller 50. Various types of valves 54 can be employed. Typically, the valve 54 is a three-way valve 54. The three-way valve 54 of the chiller-subsystem 48 is useful for re-circulating the fluid between the tank 52 of the chiller-subsystem 48 and the chiller 50. This arrangement is useful for initially forming, maintaining, and/or recharging the mass of cooled fluid in the tank 52 of the chiller-subsystem 48. For example, once a portion (or all) of the mass of cooled fluid is fed to the tool 26, fluid returning from the tool 26 can be fed to the chiller 50 and then to the tank 52 of the chiller-subsystem 48 to maintain or recharge the mass of cooled fluid. The cooled fluid may then be held or re-circulated in one or more passes between the chiller 50 and the tank 52 of the chiller-subsystem 48 to further decrease or maintain temperature of the mass of cooled fluid. This is also useful if the chiller 50 can't keep up with demands of the tool 26 and/or the system 20, where the mass of cooled fluid serves as a buffer for the chiller 50 to catch-up or recover. This is also useful for maintaining a near steady-state temperature of the fluid within the chiller-subsystem 48 to meet ongoing demands of the tool 26 and the system 20.

The three-way valve 54 of the chiller-subsystem 48 is also in fluid communication between the tank 52 of the chiller-subsystem 48 and the tool 26. As such, the three-way valve 54 of the chiller-subsystem 48 is also useful for directing the fluid from the tank 52 of the chiller-subsystem 48 to the tool 26. This is especially useful for rapidly cooling the mold surface 24 of the tool 26 as further described below. For example, the mass of cooled fluid (or a portion thereof) can be fed to the tool 26 to rapidly cool the mold surface 24. The mass of cooled fluid provided by the tank 52 of the chiller-subsystem 48 provides for a rapid change in temperature relative to what the chiller 50 could achieve on its own by providing only cooled fluid on demand. For example, the chiller 50 may be burdened during ramping down of the mold surface 24 temperature and will take time to recover. The mass of cooled fluid provides for a drastic change in temperature in a very short period of time, i.e., a maximum ΔT in the mold surface 24, without putting the entire cooling burden on the chiller 50.

Referring to FIG. 18, the three-way valve 54 of the chiller-subsystem 48 is in fluid communication i) between the tank 52 and the chiller 50 for re-circulating a second thermal fluid from the tank 52 to the chiller 50 and ii) between the tank 52 and an exchanger-subsystem 49 for directing the second thermal fluid from the tank to an exchanger 51. Optionally, the chiller-subsystem 48 may include the tank bypass line 39 in this or other embodiments. Typically, the second thermal fluid is water.

Referring to FIG. 18, the system 20 further comprises the exchanger-subsystem 49. The exchanger-subsystem 49 comprises the (heat) exchanger 51. The exchanger 51 can be of various types, such as a shell-and-tube, a shell-and-plate, etc. The exchanger-subsystem 49 further comprises a valve 53. Typically, the valve 53 is a three-way valve 53. In this embodiment, the system 20 typically includes at least one pump 55. Various types of pumps can be utilized. The pump 55 is useful for circulating the fluid within the system 20 when the heater-subsystem 40 and chiller-subsystem 48 are closed off from the tool 26, such as when recharging. Otherwise, the heater 42 can generally provide suitable pumping for the system 20.

The exchanger 51 and three-way valve 53 of the exchanger-subsystem are useful for indirectly introducing cooled fluid to the tool 26. In this embodiment, cooled fluid does not go directly to the tool 26, but to the exchanger 51 wherein the cooled fluid is used to reduce the temperature of the heated fluid that is in direct contact with the tool 26. In using the exchanger 51 to introduce cooled fluid to the tool 26, this can provide for a smaller closed loop to be established thereby allowing the closed loop to be "set" to a fixed temperature via temperature feedback of the fluid in the loop and control of the valves 46,53,54. For example, the valves 46,53,54 can be set such that the fluid flows through a check valve 57 via the pump 55 and around the smaller closed loop. Additional aspects of this embodiment are described further below.

As shown in FIG. 18, the three-way valve 53 is in fluid communication i) between the exchanger 51 and the heater-subsystem 40 for sending the first thermal fluid from the tool 26 back to the heater-subsystem 40 and ii) between the exchanger 51 and the tool 26 for directing the first thermal fluid from the tool 26 to the exchanger 51.

In general, the first thermal fluid is shared between the heater-subsystem 40 and the exchanger-subsystem 49, the second thermal fluid is shared between the chiller-subsystem 48 and the exchanger-subsystem 49, and the first thermal fluid is kept separate from the second thermal fluid. Typically, the first thermal fluid is thermal oil and the second thermal fluid is water, i.e., they are different from one another.

The system 20 is typically in communication with a controller 56. The controller 56 is typically in communication with at least one of the subsystems 40,48,49 and the tool 26, more typically in communication with all of the subsystems 40,48,49 and the tool 26. Various types of controllers 56 can be employed. Typically, the controller 56 is a programmable logic controller (PLC) 56, which may also be referred to as a programmable controller 56. The controller 56 can communicate to components of the system 20 by various methods, such as by wire, by wireless, etc.

In certain embodiments, the system 20 further comprises a valve 58, which is in addition to the valves 46,53,54 of the subsystems 40,48,49. Various types of valves 58 can be employed. Typically, the valve 58 is a three-way valve 58. Referring to FIG. 2, the three-way valve 58 of the system 20 is in fluid communication between the tool 26 and both of the subsystems 40,48. The three-way valve 58 is also in communication with the controller 56. In this embodiment, the three-way valve 58 of the system 20 is useful for directing the fluid to the heater-subsystem 40 or to the chiller-subsystem 48 after returning from the tool 26. Said another way, the controller 56 can direct fluid from the tool 26 to each of the subsystems 40,48 by controlling the three-way valve 58 of the system 20, along with the three-way valves 46,54 of each of the subsystems 40,48. Referring to FIG. 18, the three-way valve 58 may optionally be utilized, i.e., as a supplemental valve 58, such as in place of the check valve 57.

It is to be appreciated that while "three-way" valves 46,53,54,58 may generally be referred to herein, the same flow control may be achieved by a combination of different types of valves and piping 38 arrangements which "mimic" a three-way valve. For example, a combination of two-way valves and piping 38 may be utilized to achieve the same flow control as achieved by a three-way valve. As another example, a plugged four-way valve may be utilized in place of a three-way valve. Such alternate arrangements for achieving the same (or similar) flow control are contemplated as being equivalent in function as the three-way valves 46,53,54,58 described herein.

The controller 56 is also useful for controlling flow of fluid in the system 20. For example, the controller 56 can control a combination of the valves 58 of the system 20, the valves 46,53,54 of the subsystems 40,48,49 the heater 42, the chiller 50, and/or the heat exchanger 49, to direct fluid at various temperatures to and from the tool 26.

The controller 56 is especially useful for directing the masses of the heated and cooled fluid from each of the subsystems 40,48. Specifically, the controller 56 is useful for directing the mass of heated fluid from the tank 44 of the heater-subsystem 40 to rapidly heat the mold surface 24 of the tool 26. The controller 56 is also useful for directing the mass of cooled fluid from the tank 52 of the chiller-subsystem 48 to rapidly cool the mold surface 24 of the tool 26 either directly to the tool 26, such as in FIG. 2, or indirectly via the exchanger-subsystem 51, such as in FIG. 18.

In certain embodiments, the controller 56 controls the three-way valves 46,53,54,58 to direct fluid from at least one of the tanks 44,52 to the tool 26 to heat or cool the mold surface 24 of the tool 26. In further embodiments, the controller 56 controls the three-way valves 46,53,54,58 to re-circulate fluid in the other subsystem 40,48 to maintain the mass of heated or cooled fluid in the tank 44,52 of the other subsystem 40,48. Re-circulating the fluid in the subsystem 40,48 can start before, after, or during heating or cooling of the mold surface 24 with the other subsystem 40,48. As introduced above, the controller 56 can also be used to control fluid in the exchanger-subsystem 49. The controller 56 can direct the fluid in the system 20 by opening and closing the three-way valves 46,53,54,58 in particular orders and/or at particular times. The three-way valves 46,53,54,58 may be opened and/or closed simultaneously and/or concurrently. While not shown, the controller 56 may also be in communication with other valves in the system 20 to control flow of the fluid.

A specific embodiment will now be described in the following few paragraphs. Referring to FIG. 18, the controller 56 can be programmed to manipulate the subsystems 40,48,49 in various manners. In this embodiment, the controller 56 is generally programmed to instruct the three-way valve 46 of the heater-subsystem 40 at certain times such that the first thermal fluid re-circulates between the heater 42 and the tank 44 and bypasses the tool 26 to maintain the mass of heated first thermal fluid in the heater-subsystem 40.

At other times, the controller 56 is generally programmed to instruct the three-way valve 46 of the heater-subsystem 40 such that the first thermal fluid is directed from the heater-subsystem 40 and to the tool 26 to heat the mold surface 24 of the tool 26.

In addition, the controller 56 is generally programmed to instruct the three-way valve 54 of the chiller-subsystem 48 at certain times such that the second thermal fluid re-circulates between the chiller 50 and the tank 52 and bypasses the exchanger-subsystem 49 to maintain the mass of cooled second thermal fluid in the chiller-subsystem 48. At other times, the controller 56 is generally programmed to instruct the three-way valve 54 of the chiller-subsystem 48 such that the second thermal fluid is directed from the chiller-subsystem 48 to the exchanger-subsystem 49 to cool the first thermal fluid returning from the tool 26 and entering the exchanger-subsystem 51.

In addition, the controller 56 is generally programmed to instruct the three-way valve 53 of the exchanger-subsystem 49 at certain times such that the first thermal fluid returning from the tool 26 is directed to the heater-subsystem 40 and bypasses the exchanger-subsystem 51 to reheat the first thermal fluid within the heater-subsystem 40. At other times, the controller 56 is generally programmed to instruct the three-way valve 53 of the exchanger-subsystem 49 such that the first thermal fluid returning from the tool 26 is directed to the exchanger-subsystem to cool the first thermal fluid via the second thermal fluid from the chiller-subsystem 48.

In certain embodiments, the fluid may be directed into the tool 26 in a countercurrent fashion relative to a coolest or warmest area of the mold surface 24. For example, if one area of the mold surface 24 is initially the coolest relative to the remainder of the mold surface 24, and the tool 26 is being heated, the controller 56 can direct heated fluid to this location to expedite temperature change of the location based on a large initial temperature gradient. It is to be appreciated that there are also instances where concurrent flow arrangements can be useful, such as for maintaining a temperature gradient across the mold surface 24, or there may be instances where a combination of countercurrent and concurrent flow arrangements can be used. Typically, flow within the tubing 28 of the tool 26 is turbulent to promote greater thermal transfer between the mold surface 24 and the fluid within the tubing 28. Turbulence may be imparted by various means, such as by use of helically corrugated piping 38 and/or tubing 28.

While not shown, the system 20 may include one or more additional types of valves for regulating flow of the fluid within the system 20. For example, one or more ball valves may be present for stopping/starting flow of the fluid in a portion of the system 20. As another example, one or more gate valves and/or check valves may be present for preventing backflow of the fluid in a portion of the system 20. As another example, one or more globe valves may be present for regulating flow rate of the fluid in a portion of the system 20. If employed, the additional valves may be disposed in various locations of the system 20. The valves of the system 20, including the three-way valves 46,53,54,58, may be manipulated in various ways, such as pneumatically, manually, electrically, magnetically, etc. In certain embodiments, electrical control is employed, pneumatic control is employed, or combinations thereof.

The system 20 can further comprise a relief valve 60. The relief valve 60 may also be referred to as a pressure relief valve 60, a pressure safety valve 60, or a safety valve 60. Various types of relief valves 60 (and their related systems) can be employed. The relief valve 60 is typically in fluid communication between the subsystems 40,48,49 and the tool 26. The relief valve 60 is useful for relieving pressure of the fluid in the system 20. For example, an upset in the system 20 may increase pressure of the fluid to an unsafe or undesirable level. As such, the relief valve 60 can compensate for such an occurrence by releasing a portion of the fluid in the system 20 to return the pressure of the fluid to a safe or desired level. The controller 56 may be in communication with the relief valve 60 to shut down the system 20 in the event that the relief valve 60 activates to prevent damage to the system 20, press 64, etc.

The system 20 may further comprise a strainer (not shown). Various types of strainers can be employed. The strainer useful for straining the fluid to prevent clogging or other issues in the system 20 over time. The strainer can also be useful for imparting and/or maintaining turbulent flow of the fluid.

As introduced above, the system 20 may further comprise one or more pumps 55. Various types of pumps can be employed, such as those generally used for moving heat transfer fluids. In certain embodiments, such as those lacking the exchanger-subsystem 51, the heater 42 and chiller 50 generally provide sufficient pumping of the fluid.

Utilizing the system 20, the mold surface 24 of the tool 26 can be heated at various rates. The rate of heating may be linear or curvilinear. For example, the rate of heating can increase at a decreasing rate, increase at an increasing rate, be substantially constant, or combinations thereof. Typically, the mold surface 24 heats at a rate of greater than about 60, greater than about 70, greater than about 80, greater than about 90, or greater than about 100, ° F. per minute (or greater than ~33, greater than ~39, greater than ~44, greater than ~50, or greater than ~56, ° C. per minute). In certain embodiments, the mold surface 24 can be heated at a rate upwards of about 300, about 250, about 225, or about 200, ° F. per minute (~167, ~139, ~125, or ~111, ° C. per minute).

Utilizing the system 20, the mold surface 24 of the tool 26 can be cooled at various rates. The rate of cooling may be linear or curvilinear. For example, the rate of cooling can increase at a decreasing rate, increase at an increasing rate, be substantially constant, or combinations thereof. Typically, the mold surface 24 cools at a rate of greater than about 40, greater than about 50, greater than about 60, greater than about 70, greater than about 80, greater than about 90, or greater than about 100, ° F. per minute (or greater than ~22, greater than ~28, greater than ~33, greater than ~39, greater than ~44, greater than ~50, or greater than ~56, ° C. per minute). In certain embodiments, the mold surface 24 can be cooled at a rate upwards of about 200, about 175, or about 150, ° F. per minute (~111, ~97, or ~83, ° C. per minute).

The present invention further provides a method. The method is useful for heating and cooling the mold surface 24 of the tool 26. The method comprises the step of providing the heater-subsystem 40. In certain embodiments, the method further comprises the step of providing the chiller-subsystem 48. In various embodiments, the method further comprises the step of providing the exchanger-subsystem 49. In various embodiments, the method further comprises the step of providing the controller 56. Typically, the method further comprises the step of providing the tool 26. The tool 26 can be provided manually or automatically. For example, the tool 26 may be provided by a technician or by a robot (not shown). The tool 26 and subsystems 40,48,49 can be as described above.

The method further comprises the step of directing the mass of heated fluid from the tank 44 of the heater-subsystem 40 to the tool 26. The mass of heated fluid can be directed by the controller 56 communicating with the subsystems 40,48,49 and the three-way valve 58 of the system 20 as described above.

The mass of heated fluid heats the mold surface 24 of the tool 26 from a first temperature ($T_1$) to a second temperature ($T_2$) within a first period of time ($Tt_1$). $T_1$ can be various temperatures. For example, $T_1$ can be the temperature of the mold surface 24 at startup, i.e., the mold surface 24 can be at ambient (or room) temperature. Alternatively, $T_1$ can be the temperature of the mold surface 24 after a previous cycle of heating and cooling. As such, the mold surface 24 may be hotter (or cooler) than ambient temperature. Typically, $T_1$ is from about 50 to about 125, from about 75 to about 125, from about 90 to about 125, or from about 100 to about 120, ° F. (~10 to ~52, ~24 to ~52, ~32 to ~52, or ~38 to ~49, ° C.).

$Tt_1$ can be various time periods. Typically, $Tt_1$ is short relative to subsequent time periods of heating and cooling. However, $Tt_1$ may also be longer than or equal to one or more subsequent time periods of heating and cooling. Typically, $Tt_1$ is from about 1 to about 25, from about 1 to about 20, from about 1 to about 15, from about 1 to about 10, from about 2.5 to about 10, from about 2.5 to about 7.5, or from about 4 to about 6, minutes.

$T_2$ can be various temperatures. For example, $T_2$ can be the maximum temperature of the mold surface 24 reached during heating. Typically, $T_2$ is from about 250 to about 400, from about 250 to about 375, from about 275 to about 375, from about 300 to about 375, or from about 325 to about 350, ° F. (~121 to ~204, ~121 to ~191, ~135 to ~191, ~149 to ~191, or ~163 to ~177, ° C.).

In general, the mass of heated fluid in the tank 44 of heater-subsystem 40 is at a temperature of about $T_2$ or higher. It is useful when the mass of the heated fluid is at least about 50° F. (10° C.) higher than $T_2$ to facilitate heat transfer between the mass and the mold surface 24 of the tool 26, and more typically much higher than $T_2$. In certain embodiments, the mass of heated fluid in the tank 44 of the heater-subsystem 40 is at a temperature of from about 250 to about 600, from about 300 to about 550, from about 350 to about 500, or from about 400 to about 450, ° F. (~121 to ~316, ~149 to ~288, ~177 to ~260, or ~204 to ~232, ° C.). Due to the mass of heated fluid, the system 20 can rapidly heat the mold surface 24 of the tool 26 as described above.

The method further comprises the step of directing fluid from the heater-subsystem 40 to the mold surface 24 of the tool 26. The fluid can be directed by the controller 56 communicating with the subsystems 40,48 and the three-way valve 58 of the system 20. The fluid maintains the mold surface 24 at about $T_2$ for a second period of time ($Tt_2$). The mold surface 24 can be maintained at $T_2$ or at an acceptable tolerance level, e.g. $Tt_2 \pm 15°$ F. (±~9° C.). Maintaining the mold surface 24 at about $T_2$ for $Tt_2$ is useful for curing resin of the composite article 22. It is also believed to be useful for increasing surface properties of the composite article 22. Thermostat modulation can be used for staying within the tolerance level.

$Tt_2$ can be various time periods. Typically, $Tt_2$ is shorter than $Tt_1$. However, $Tt_2$ may also be longer than or equal to $Tt_1$ or a subsequent time period. Typically, $Tt_2$ is from about 1 to about 25, from about 1 to about 20, from about 1 to about 15, from about 1 to about 10, from about 1 to about 7.5, from about 1 to about 5, or from about 1 to about 2.5, minutes.

In certain embodiments, the method further comprises the step of maintaining the mold surface 24 of the tool 26 at an intermediate temperature ($T_{1-2}$) of between $T_1$ and $T_2$. Typically, this step occurs prior to heating the mold surface 24 of the tool 26 to $T_2$. $T_{1-2}$ can be maintained by only feeding a portion of the mass of heated fluid to the mold surface 24 and/or by controlling overall temperature of the heater-subsystem 40.

The fluid maintains the mold surface 24 at about $T_{1-2}$ for a portion of $Tt_1(Tt_{<1})$. The fluid can be directed by the controller 56 communicating with the subsystems 40,48 and the three-way valve 58 of the system 20. The mold surface 24 can be maintained at $T_{1-2}$ or at an acceptable tolerance level, e.g. $T_{1-2} \pm 15°$ F. (±~9° C.). It is believed that maintaining the mold surface 24 at about $T_{1-2}$ for $Tt_2$ is useful for consolidating the composite article 22. For example, resin of the composite article 22 reaches its minimum viscosity and/or thins to more readily flow into the carbon fiber mat of the composite article 22. Such consolidation is believed to be useful for achieving mechanical properties and improving the Class A surface of body panels of the composite article 22, if formed. Thermostat modulation can be used for staying within the tolerance level.

$T_{1-2}$ can be various temperatures. For example, $T_{1-2}$ can be in the middle of $T_1$ and $T_2$, closer to $T_1$, or closer to $T_2$. Typically, $T_{1-2}$ is from about 100 to about 350, from about 150 to about 325, from about 200 to about 300, from about 225 to about 275, or from about 235 to about 265, ° F. (~38 to ~177, ~66 to ~163, ~93 to ~149, ~107 to ~135, or ~113 to ~129, ° C.).

$Tt_{<1}$ can be various time periods, provided it is less than $Tt_1$. Typically, $Tt_{1-2}$ is longer than $Tt_2$. However, $Tt_{1-2}$ may also be shorter than or equal to $Tt_2$ or a subsequent time period. Typically, $Tt_{<1}$ is from about 1 to less than about 25, from about 1 to about 20, from about 1 to about 15, from about 1 to about 10, from about 1 to about 7.5, from about 1 to about 5, or from about 1 to about 2.5, minutes. In certain embodiments, $Tt_{<1}$ is from 1 to less than 10 minutes.

In certain embodiments, such as the one of FIG. 2, the method further comprises the step of directing the mass of cooled fluid from the tank 52 of the chiller-subsystem 48 to the tool 26 to cool the mold surface 24 of the tool 26 from about $T_2$ to a third temperature ($T_3$) within a third period of time ($Tt_3$). In other embodiments, the heater-subsystem 40 is used to cool the mold surface 24 in a similar manner. Typically, either one of these steps occurs after maintaining the mold surface 24 of the tool 26 at $T_2$ for $Tt_2$. The mass of cooled fluid can be directed by the controller 56 communicating with the subsystems 40,48 and the three-way valve 58 of the system 20. In other embodiments, such as the one of FIG. 18, the method further comprises the step of directing the mass of cooled second thermal fluid from the tank 52 of the chiller-subsystem 48 to the exchanger-subsystem 49 via the controller 56 to cool the mold surface 24 of the tool 26 from $T_2$ to $T_3$ within $Tt_3$.

$T_3$ can be various temperatures. For example, $T_3$ can be the temperature of the mold surface 24 at startup, i.e., the mold surface 24 can be at ambient (or room) temperature. $T_3$ is generally higher than ambient temperature. Typically, $T_3$ is from about 75 to about 150, from about 85 to about 140, from about 90 to about 130, or from about 100 to about 120, ° F. (~24 to ~66, ~29 to ~60, ~32 to ~54, or ~38 to ~49, ° C.).

$Tt_3$ can be various time periods. Typically, $Tt_3$ is long relative to previous time periods of heating. However, $Tt_3$ may also be longer than or equal to one or more previous time periods of heating. Typically, $Tt_3$ is from about 1 to about 25, from about 1 to about 20, from about 1 to about 15, from about 1 to about 10, from about 2.5 to about 10, from about 2.5 to about 7.5, or from about 4 to about 6, minutes.

In general, the mass of cooled fluid in the tank 52 of chiller-subsystem 48 is at a temperature of about $T_3$ or lower. It is useful when the mass of the cooled fluid is at least about 50° F. lower than $T_3$ to facilitate heat transfer between the mold surface 24 of the tool 26 and the mass. In certain embodiments, the mass of the cooled fluid in the tank 52 of the chiller-subsystem 48 is at a temperature of from about 35 to about 70, about 40 to about 60, about 45 to about 55, or about 50, ° F. (~1.7 to ~21, ~4.4 to ~16, ~7 to ~13, or ~10, ° C.). As such, the system 20 can rapidly cool the mold surface 24 of the tool 26 with the mass of cooled fluid.

As described above, the method is useful for heating the mold surface 24 of the tool 26. Typically, the mold surface 24 of the tool 26 heats at a rate of greater than about 60, about 70, about 80, about 90, about 100, about 110, about 120, about 130, about 140, about 150, about 160, about 170, or about 180, ° F. per minute (greater than ~33, greater than ~39, greater than ~44, greater than ~50, greater than ~56, greater than ~61, greater than ~67, greater than ~72, greater than ~78, greater than ~83, greater than ~89, greater than ~94, or greater than ~100, ° C. per minute).

As also described above, the method is useful for cooling the mold surface 24 of the tool 26. Typically, the mold surface 24 of the tool 26 cools at a rate of greater than about 40, about 50, about 60, about 70, about 80, about 90, about 100, about 110, about 120, about 130, about 140, about 150, about 160, about 170, or about 180, ° F. per minute (greater than ~33, greater than ~39, greater than ~44, greater than ~50, greater than ~56, greater than ~61, greater than ~67, greater than ~72, greater than ~78, greater than ~83, greater than ~89, greater than ~94, or greater than ~100, ° C. per minute).

As introduced above, the controller 56 can be programmed with various control schemes to heat and cool the mold surface 24 using the subsystems 40,48,49 and three-way valve 58 of the system 20, if utilized. For example, the controller 56 can be programmed to open or close one or more of the three-way valves 46,53,54,58 at certain times and/or at certain temperatures of the mold surface 24. Such control methodology is useful for directing the fluid to the tool 26 and/for re-circulating the fluid as described above. As a starting point, control schemes of the controller 56 may be modeled off of control schemes generally used with autoclaves.

In certain embodiments, the controller 56 is programmed such that $Tt_1 \leq Tt_2$ or $Tt_1 \geq Tt_2$. In further embodiments, the controller 56 is programmed such that $Tt_1 \geq Tt_3$ or $Tt_1 \leq Tt_3$. Typically, $Tt_1+Tt_2+Tt_3$ is no greater than about 30, about 25, about 20, about 19, about 18, about 17.5., about 17, about 15, about 14, about 13.5, about 13, about 12.5, about 12, about 11, about 10, about 7.5, about 5, about 2.5, or about 2, minutes. In certain embodiments, $Tt_1+Tt_2+Tt_3$ is no greater than about 20 minutes, no greater than about 19 minutes, no greater than about 18 minutes, or no greater than about 17 minutes, and can be downwards of about 15, about 10, or about 5, minutes. Due to the direct heating and cooling of the mold surface 24 of the tool 26 via the system 20, cycle time of making the composite articles 22 is greatly reduced relative to conventional methods, such as autoclaving.

The controller 56 typically measures temperature of the mold surface 24 by feedback from one or more resistive thermal device (RTD) (not shown) disposed proximal the mold surface 24. The controller 56 can also measure temperature of the fluid by one or more RTDs disposed in or proximal the piping 38 at one or more locations and/or by one or more RTDs disposed in or proximal the subsystems 40,48,49. Various types of RTDs can be employed.

The present invention further provides a method of forming the composite article 22. The method comprises the step of providing the tool 26. The tool 26 can be as described above. The method further comprises the step of providing a preform 62. The preform 62 can be provided manually or automatically.

The preform 62 comprises a carbon fiber mat and a resin. Various types of carbon fiber mat can be employed, such as a continuous fiber mat. The carbon fiber mat may also be referred to as a fabric or a braid. The carbon fiber mat can include one or more layers of fibers, typically at least two layers of fibers. The carbon fibers can be of various types, such as standard modulus, intermediate modulus, high modulus, or high strength, carbon fibers. In certain embodiments, the carbon fibers are unidirectional.

The carbon fiber mat can be substantially dry and/or a pre-preg. In certain embodiments, the carbon fiber mat is a carbon fiber pre-preg, which may also be referred to as a prepreg. Suitable carbon fiber mats are commercially available from a variety of suppliers. Specific examples of carbon fiber mats include those commercially available from Toray Carbon Fibers America, Inc. of Flower Mound, Tex., including the TORAYCA® Series, e.g. TORAYCA® T700S; and from Toray Composites (America), Inc., of Tacoma, Wash. Further specific examples of carbon fiber mats include those commercially available from Advanced Composites Group of Tulsa, Okla.; and from Grafil, Inc. of Sacramento, Calif., including the GRAFIL Series and the PYROFIL™ Series, e.g. PYROFIL™ TR30S.

Various types of resins can be employed, including both thermoplastic and/or thermosetting resins. Typically, the resin is a thermosetting resin. Examples of suitable thermosetting resins include epoxy resins. In certain embodiments, the resin comprises an epoxy resin. The resin can include (or be mixed) with one or more hardeners to promote cure of the resin. Various types of hardeners can be employed. The resin should be capable of curing in the time periods described above to utilize the rapid heating and cooling provided by the system 20. Suitable resins are commercially available from a variety of suppliers. Specific examples of resins include those commercially available from Huntsman International LLC of Salt Lake City, Utah; from Toray Carbon Fibers America, Inc.; from Toray Composites (America), Inc., including G83 pre-preg resin; and from Advanced Composites Group, including MTM57 pre-preg resin.

As introduced above, the composite article 22 may be formed from a pre-preg, which is a carbon fiber mat previously infused with a resin, being either wet or dry, typically slightly wet. It is to be appreciated that if the pre-preg is employed, additional resin being the same or different from that of the pre-preg may be employed to form the composite article 22. Alternatively, just the resin provided with the pre-preg can be employed as the resin. Various types of pre-pregs can be employed. Specific examples of pre-pregs or pre-preg systems include those commercially available from Toray Composites (America), Inc., such as PC7831-190-1000; and from Advanced Composites Group, such as MTM57/CF3238.

The method further comprises the step of disposing the preform 62 on the mold surface 24 of the tool 26. The preform 62 may be disposed manually or automatically. The method further comprises the step of heating the mold surface 24 of the tool 26 from $T_1$ to $T_2$ within $Tt_1$. $T_1$, $T_2$, and $Tt_1$ can be as described above. Heating the mold surface 24 is useful for thinning the resin of the preform 62. As such, the resin is better able to flow around, into, and within the carbon fiber mat. The mold surface 24, and therefore, the preform 62, can be heated with the system 20 as described above.

The method further comprises the step of applying pressure to the preform 62. Pressure may be applied by various means. Typically, pressure is applied by a press 64, as described further below. The pressure is applied from a first pressure ($P_1$) to a second pressure ($P_2$).

Pressure can be applied at various rates. The rate of pressurizing may be linear or curvilinear. For example, the rate of pressurizing can increase at a decreasing rate, increase at an increasing rate, be substantially constant, or combinations thereof. Typically, pressure is applied at a rate of greater than about 0.1, greater than about 0.2, greater than about 0.3, greater than about 0.4, greater than about 0.5, greater than about 0.6, greater than about 0.7, greater than about 0.8, greater than about 0.9, greater than about 1, greater than about 1.1, greater than about 1.2, greater than about 1.3, greater than about 1.4, greater than about 1.5, or greater than about 2, pounds per square inch (psi) per second (sec) (where 1 psi/sec is ~2.07 kPa/sec).

$P_1$ can be various pressures. For example, $P_1$ can be standard atmospheric pressure (~14.7 psi). Typically, $P_1$ is from about 0 to about 5, from about 0 to about 1, from about 0 to about 0.5, from about 0 to about 0.25, or from about 0 to about 0.1, psi gauge (psig) (where 1 psig is ~2.07 kPa gauge).

$P_2$ can be various pressures. For example, $P_2$ can be the maximum pressure reached during pressurizing. Typically, $P_2$ is from about 50 to about 150, from about 60 to about 140, from about 70 to about 130, from about 80 to about 120, from about 90 to about 110, or about 100, psig.

The pressure is applied within a first period of time ($Pt_1$). Applying the pressure is useful for consolidating the preform 62, especially after the resin has thinned via application of heat. $Pt_1$ can be various time periods. Typically, $Pt_1$ is short relative to subsequent time periods of pressurizing or depressurizing. However, $Pt_1$ may also be longer than or equal to one or more subsequent time periods of pressurizing or depressurizing. Typically, $Pt_1$ is from about 1 to about 25, from about 1 to about 20, from about 1 to about 15, from about 1 to about 10, from about 2.5 to about 10, from about 2.5 to about 7.5, or from about 4 to about 6, minutes.

The method further comprises the step of maintaining pressure at about $P_2$ for a second period of time ($Pt_2$). The pressure can be maintained at $P_2$ or at an acceptable tolerance level, e.g. $P_2 \pm 10$ psi (wherein 1 psi is ~2.07 kPa). Maintaining the pressure at about $P_2$ for $Pt_2$ is useful for further consolidation and curing the resin of the composite article 22. Modulation can be used for staying within the tolerance level.

$Pt_2$ can be various time periods. Typically, $Pt_2$ is shorter than $Pt_1$. However, $Pt_2$ may also be longer than or equal to $Pt_1$ or a subsequent time period. Typically, $Pt_2$ is from about 1 to about 25, from about 1 to about 20, from about 1 to about 15, from about 1 to about 10, from about 1 to about 7.5, from about 1 to about 5, or from about 1 to about 2.5, minutes.

In certain embodiments, the method further comprises the step of maintaining pressure at an intermediate pressure ($P_{1-2}$) of between $P_1$ and $P_2$ for a portion of $Pt_1$ ($Pt_{<1}$) prior to $P_2$. Typically, this step occurs prior to pressurizing to $P_2$. The pressure can be maintained at $P_{1-2}$ or at an acceptable tolerance level, e.g. $P_{1-2} \pm 10$ psi. It is believed that maintaining the pressure at about $P_{1-2}$ for $Pt_{<1}$ is useful for consolidating the composite article 22. For example, the resin can be at its minimum viscosity or thinned to more readily flow within the carbon fiber mat of the preform 62. Modulation can be used for staying within the tolerance level.

$P_{1-2}$ can be various pressures. For example, $P_{1-2}$ can be in the middle of $P_1$ and $P_2$, closer to $P_1$, or closer to $P_2$. Typically, $P_{1-2}$ is from about 25 to about 125, from about 35 to about 115, from about 45 to about 105, from about 50 to 100, from about 55 to about 95, from about 65 to about 85, or about 75, psig.

$Pt_{<1}$ can be various time periods, provided it is less than $Pt_1$. Typically, $Pt_{1-2}$ is longer than $Pt_2$. However, $Pt_{1-2}$ may also be shorter than or equal to $Pt_2$ or a subsequent time period. Typically, $Pt_{<1}$ is from about 1 to less than about 25, from about 1 to about 20, from about 1 to about 15, from about 1 to about 10, from about 1 to about 7.5, from about 1 to about 5, or from about 1 to about 2.5, minutes.

The method further comprises the step of reducing pressure on the composite article 22. The method further comprises the step of cooling the mold surface 24 of the tool 26 to drop the mold surface 24 from about $T_2$ to $T_3$ within $Tt_3$. The mold surface 24 of the tool 26 can be cooled with the system 20 as described above. The method further comprises the step of removing the composite article 22 from the mold surface 24 of the tool 26. The composite article 22 may be removed manually or automatically.

As described above, the system 20 can be used to heat and cool the mold surface 24 of the tool 26. The controller 56 can be programmed with various control schemes to heat and cool the mold surface 24 using the subsystems 40,48,49 and three-way valve 58 of the system 20, if utilized. The controller 56 can also be programmed to apply and remove pressure to the composite article 22 at various times and/or at various temperatures.

As alluded to above, pressure can be applied by various means. In certain embodiments, described further below, a pressure tank 66 is used along with the press 64 to apply pressure to the composite article 22. It is to be appreciated that reference to the composite article 22 herein may also refer to the preform 62 depending on its degree of formation.

In certain embodiments, the controller 56 is programmed such that $Tt_1 \leq Tt_2$ or $Tt_1 \geq Tt_2$. In further embodiments, the controller 56 is programmed such that $Tt_1 \geq Tt_3$ or $Tt_1 \leq Tt_3$. The total of $Tt_1 + Tt_2 + Tt_3$ is as described above. In certain embodiments, the controller 56 is programmed such that $Pt_1 \leq Pt_2$ or $Pt_1 \geq Pt_2$. In further embodiments, the controller 56 is programmed such that $Pt_1 \leq Tt_1$ or $Pt_1 \geq Tt_1$. In yet further embodiments, the controller 56 is programmed such that $Pt_2 \leq Tt_1$ or $Pt_2 \geq Tt_1$. Typically, $(Pt_1 + Pt_2) \leq (Tt_1 + Tt_2 + Tt_3)$. Said another way, the total time for heating and cooling generally defines the total cycle time for forming the composite article 22.

Figure 11:
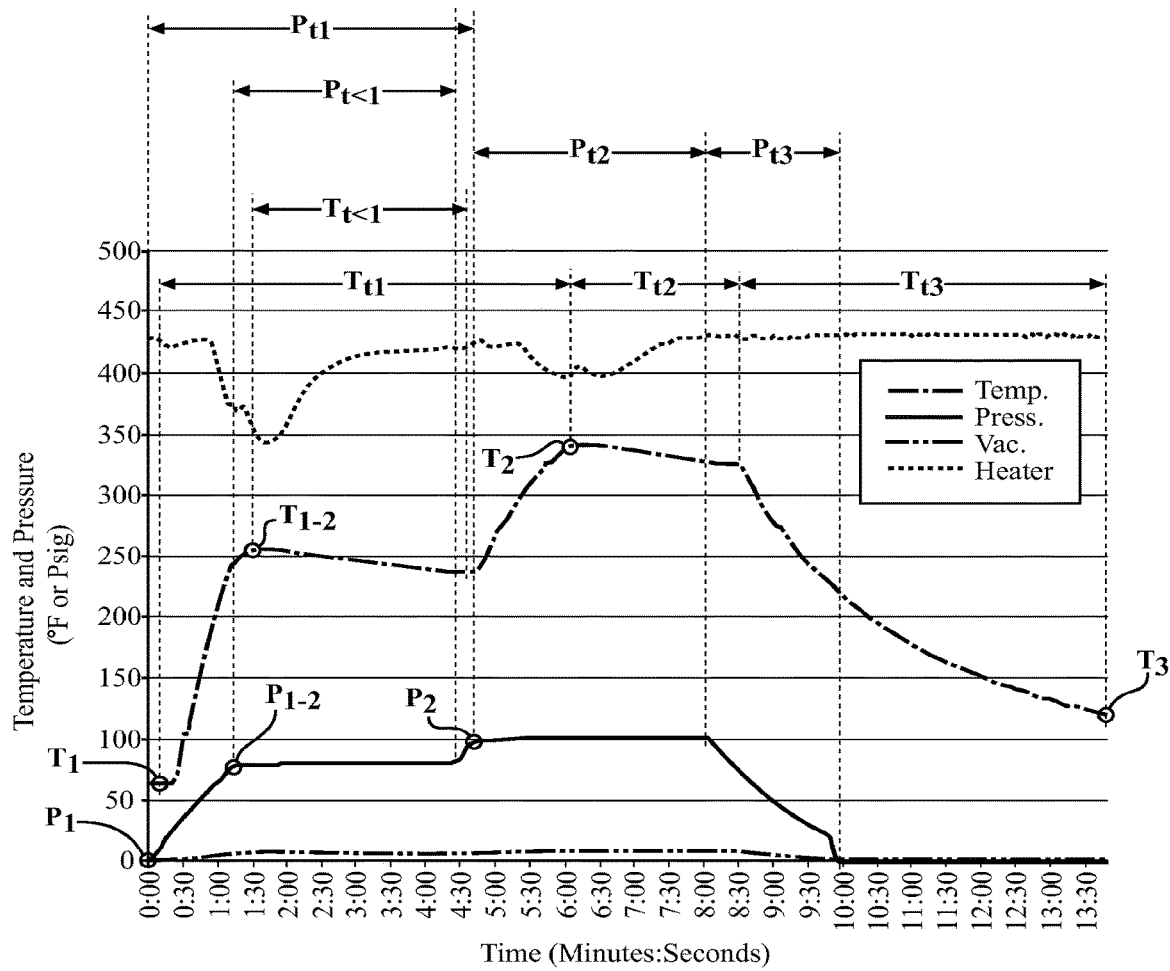
FIG. 11 is a graph illustrating temperature, pressure, vacuum and heater profiles over time for an invention example of the composite article using the thermal system and press.
Figure 12:
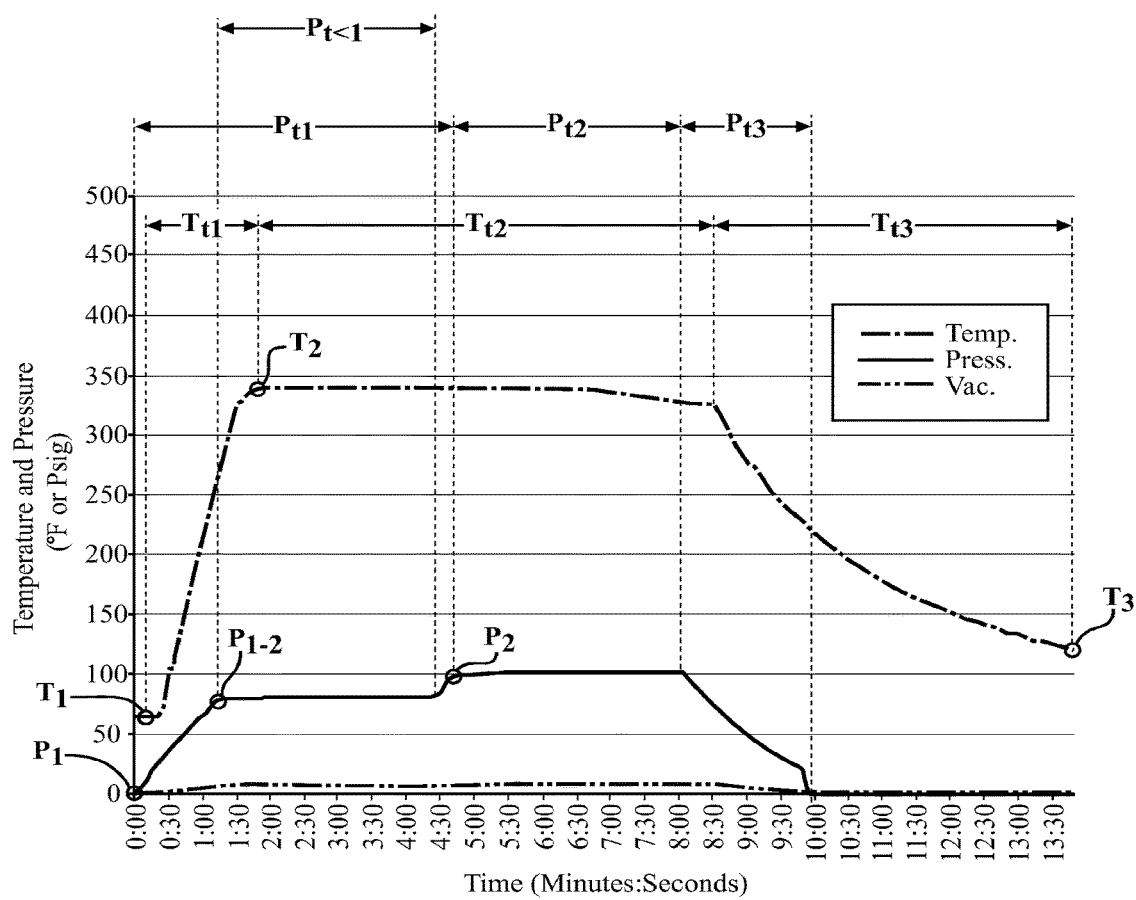
FIG. 12 is another graph illustrating temperature, pressure, and vacuum profiles over time for another invention example of the composite article using the thermal system and press.
Figure 13:
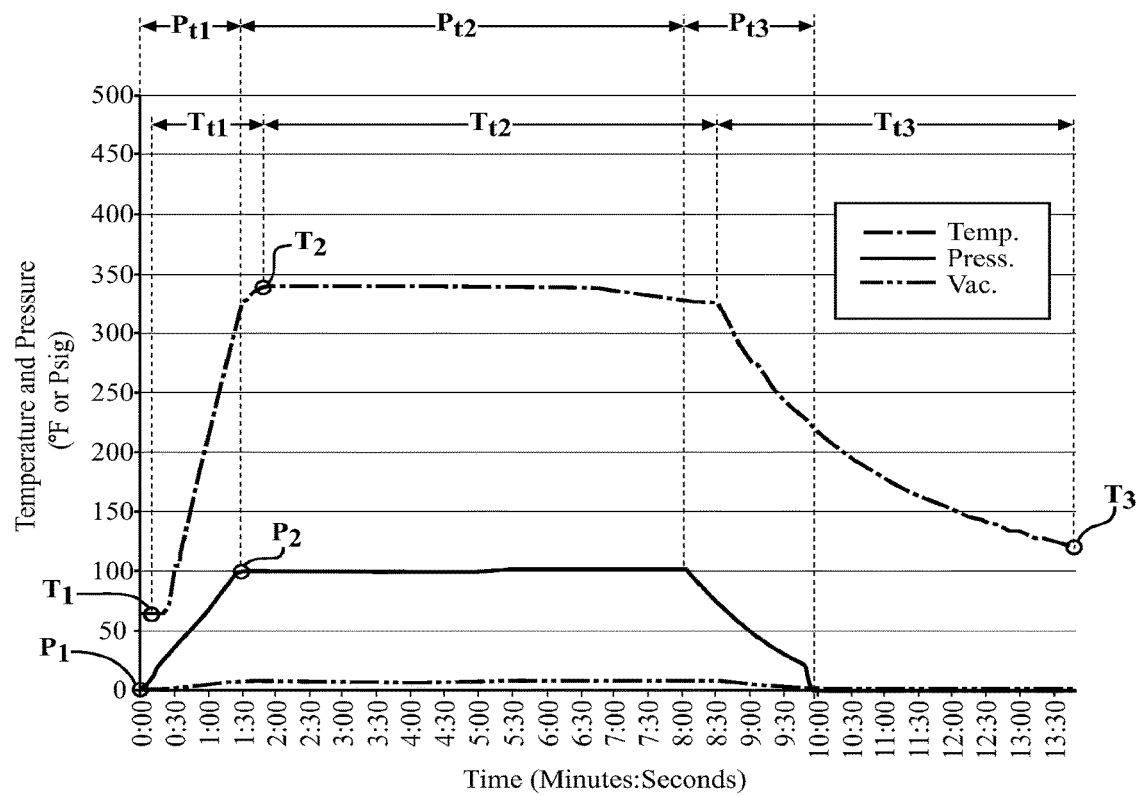
FIG. 13 is another graph illustrating temperature, pressure, and vacuum profiles over time for another invention example of the composite article using the thermal system and press.

Timing for each of the temperature and pressure time periods can be changed to alter surface and/or mechanical properties of the composite article 22. Specific heating, cooling, pressurizing, and depressurizing profiles, for making different types of composite articles 22, can be determined via routine experimentation. Examples of specific profiles are illustrated in FIGS. 11, 12, and 13, which are described further below. As described above, due to the direct heating and cooling of the mold surface 24 via the system 20, cycle time of making the composite article 22 is greatly reduced relative to conventional methods, e.g. autoclaving.

The present invention provides another method. The method is useful for forming the composite article 22. The method comprises the steps of providing the tool 26 and the preform 62. The tool 26 and preform 62 can be as described above.

The method further comprises the step of providing the press 64. The press 64 can be situated proximal or distal each of the system 20, the pressure tank 66, and/or the controller 56. The subsystems 40,48,49 of the system 20 can be situated proximal or distal each other. If utilized, the exchanger-subsystem 49 is typically proximal the press 64. The controller 56 can be situated proximal or distal each of the subsystems 40,48,49 and the pressure tank 66. As such, the system 20 offers flexibility in laying out each of its components.

Figure 5:
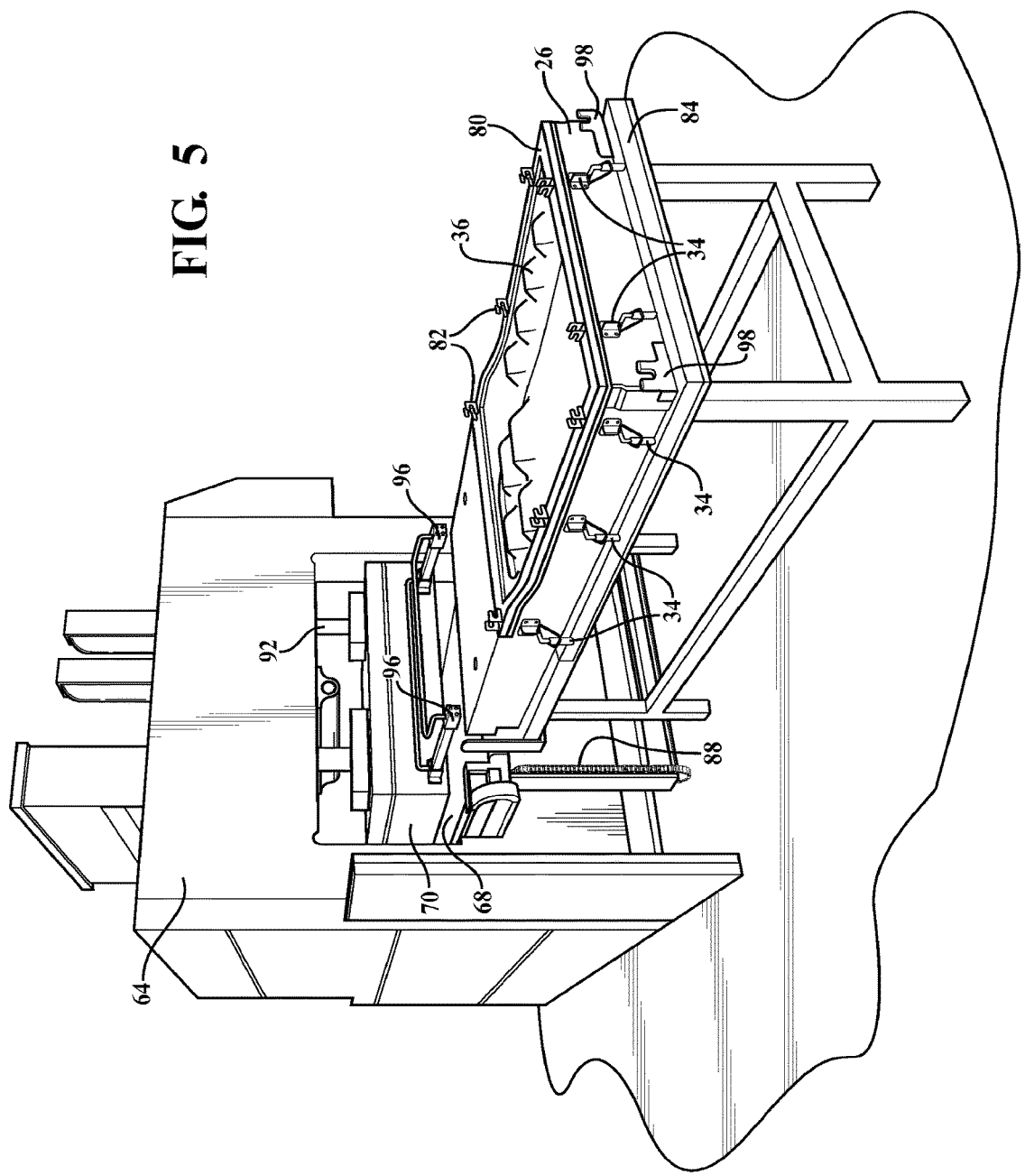
FIG. 5 is a perspective view of a support table, the tool disposed on the support table, the vacuum canopy disposed on the tool, and the press having a platform and a cover.
Figure 6:
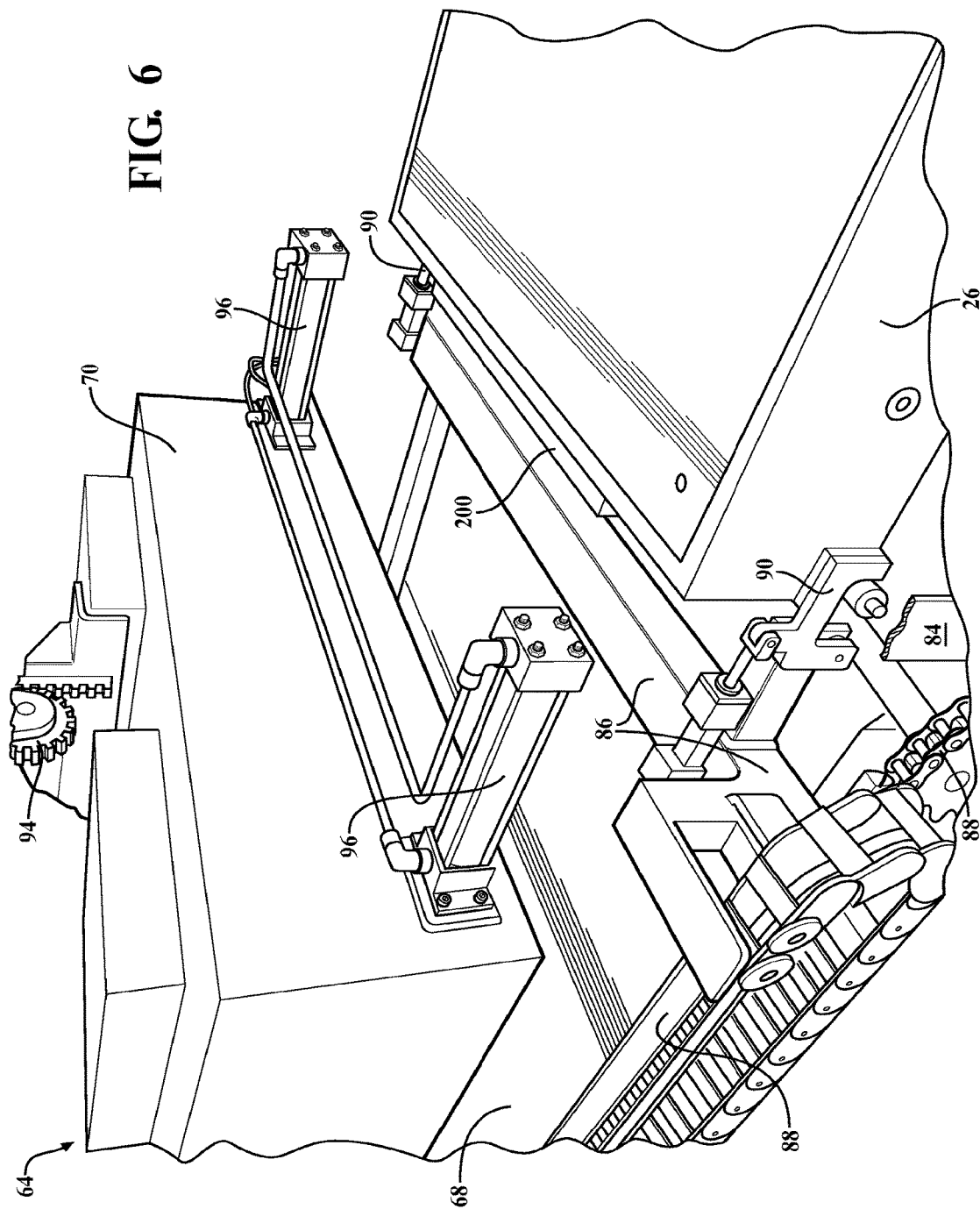
FIG. 6 is an enlarged perspective view detailing portions of the press and tool illustrated in FIG. 5, with the press including a carrier and rams for moving the tool in and out of the press.
Figure 7:
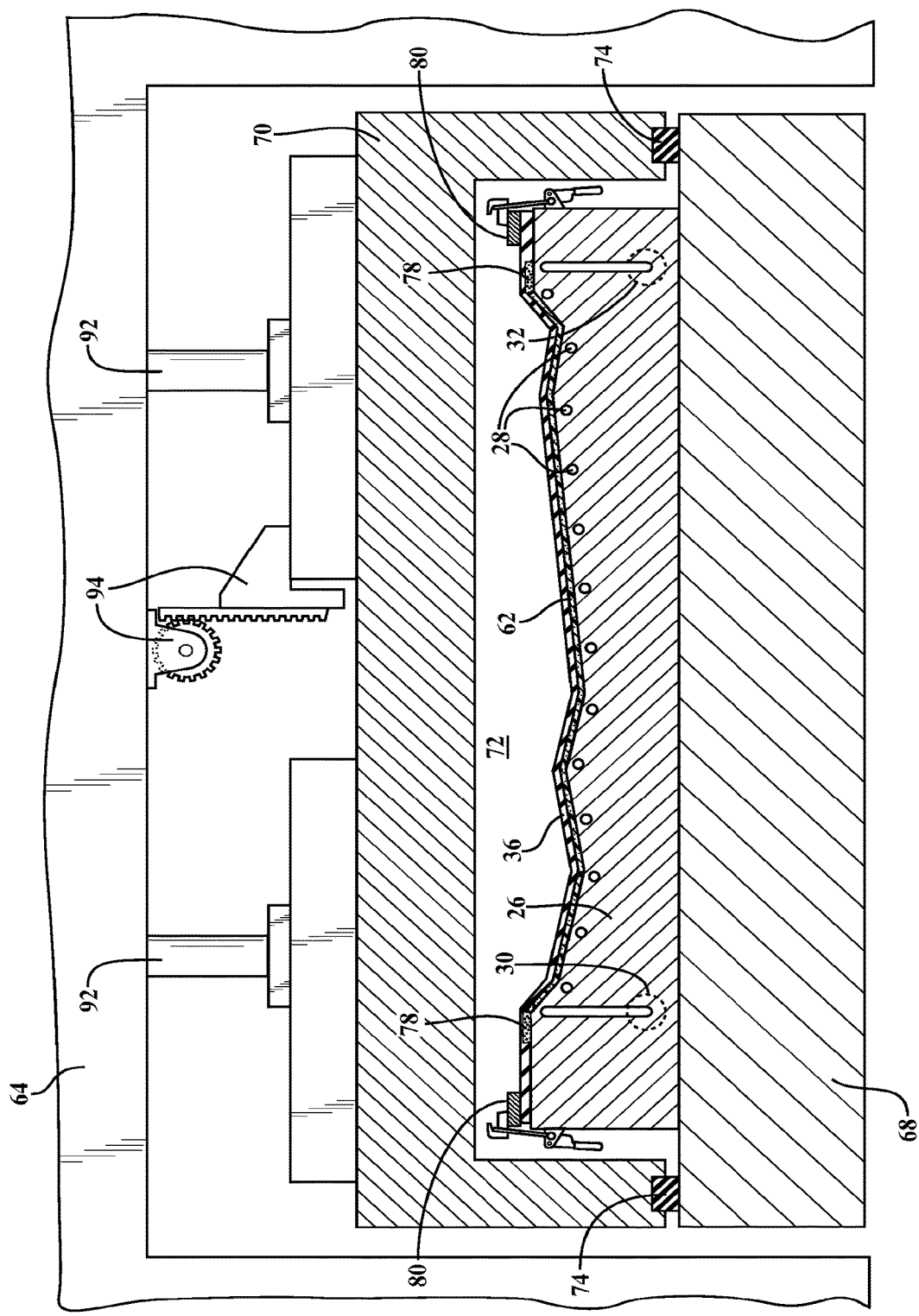
FIG. 7 is a partial cross-sectional end-view of the press having a cavity defined between the platform and the cover, the tool having the mold surface and tubing, the vacuum canopy attached to the tool, and the preform of the composite article disposed between the mold surface and vacuum canopy.

Referring to FIGS. 5-7, the press 64 has a platform 68 and a cover 70 facing the platform 68. The platform 68 of the press 64 is useful for supporting the tool 26. The method further comprises the step of contacting (or coupling) the platform 68 with the cover 70 to define a cavity 72 between the cover 70 and the platform 68. The cavity 72 may also be referred to as a plenum. Typically, the cover 70 and/or the platform 68 include a peripheral seal 74, such as a peripheral gasket 74, such that the cavity 72 is airtight. In this way, the cavity 72 is operable to maintain a pressurized and/or temperature controlled environment about the tool 26. Various types of seals 74 can be employed. In these embodiments, the cover 70 is generally rigid and inflexible (which is different from a rubber or "bladder" type mold surface). Various types of presses 64 can be employed. The press 64 should be capable of handling the pressures described herein. Suitable presses 64 are commercially available from a variety of suppliers. Specific examples of presses 64 include those available from Globe Machine Manufacturing Company of Tacoma, Wash.

Referring to FIG. 3, the method further comprises the step of disposing the preform 62 on the mold surface 24 of the tool 26. The method further comprises the step of disposing the vacuum canopy 36 on the tool 26 to define an envelope (not shown) between the vacuum canopy 36 and the mold surface 24 of the tool 26. The preform 62 and the vacuum canopy 36 may be disposed manually or automatically.

The vacuum canopy 36 may also be referred to as a bag 36 or a sheet 36. The vacuum canopy 36 can be formed from various materials, such as a polymeric material, e.g. a silicone. The vacuum canopy 36 can include a peripheral seal 78, e.g. a peripheral gasket 78, to assist in forming the envelope. In addition, or alternatively, putty 78 can be used. Various types of seals 78 and/or putty 78 can be employed. Typically, the envelope is airtight. The vacuum canopy 36 can include a peripheral frame 80 for adding rigidity and easing handling of the vacuum canopy 36. Handles (not shown) may be attached to the peripheral frame 80 for moving the vacuum canopy 36. Clasps 82 can also be attached to the peripheral frame 80 to interact with the fasteners 34 of the tool 26. The clasps 82 and fasteners 34 are useful for maintaining orientation of the vacuum canopy 36 on the tool 26.

A release sheet (not shown) may be disposed between the vacuum canopy 36 and the preform 62 to prevent sticking. A release sheet or coating (not shown) may also be applied to the mold surface 24 to prevent the composite article 22 from sticking. Various types of release sheets and/or coatings may be employed. The release sheet may be formed from various materials, such as a polymeric film.

The method further comprises the step of disposing the tool 26 under the cover 70 such that it is within the cavity 72 of the press 64 once established. The tool 26 is generally disposed under the cover 70 of the press 64 prior to contacting the cover 70 to the platform 68 to establish the cavity 72. The tool 26 generally takes up at least about 33%, at least about 50%, at least about 66%, at least about 75%, at least about 80%, at least about 85%, or at least about 90%, of the overall volume of the cavity 72, when disposed therein. As such, the remaining volume of the cavity 72 is typically small relative to the overall volume when the tool 26 is present. Inserts, partitions, or blocks (not shown) can be used to take up additional volume in the cavity, if desired.

Referring to FIGS. 5 and 6, a support table 84 is disposed next to the press 64. The support table 84 is useful for holding, loading, and unloading the tool 26. Another support table 84 may be used on an opposite side of the press 64 for unloading, or just one support table 84 may be used.

A carrier 86 is disposed adjacent the platform 68. The carrier 86 is generally on a chained track 88 and includes at least one hook 90 to engage the tool 26, and typically includes one hook 90 for engaging each side of the tool 26. The carrier 86 is useful for pulling the tool 26 from the support table 84 onto the platform 68 of the press 64, and under the cover 70 of the press 64.

After the carrier 86 moves the tool 26 a majority of the way under the cover 70, the carrier 86 moves out of the way of the cover 70. The cover 70 then lowers down over the platform 68 to engage (or couple to) the platform 68 and define the cavity 72. Pistons 92 and/or gears 94 can be used to move the cover 70 of the press 64 up and down into place.

Once the cover 70 is in contact with the platform 68, rams 96 disposed on the cover 70, extend into the cover 70 and the cavity 72. The rams 96 engage with receivers 98 on the tool 26 and push the tool 26 further on the platform 68 to substantially center the tool 26 within the cavity 72. At this point, the tool 26 is generally aligned such that it is in fluid communication with the system 20. Such fluid communication from the tool 26 to the system 20 can be routed through the cover 70 and/or through the platform 68 of the press 64. The press 64 can include one or more sensors (not shown) to ensure proper location of the tool 26 prior to lowering the cover 70 and/or prior to heating the mold surface 24.

Figure 15:
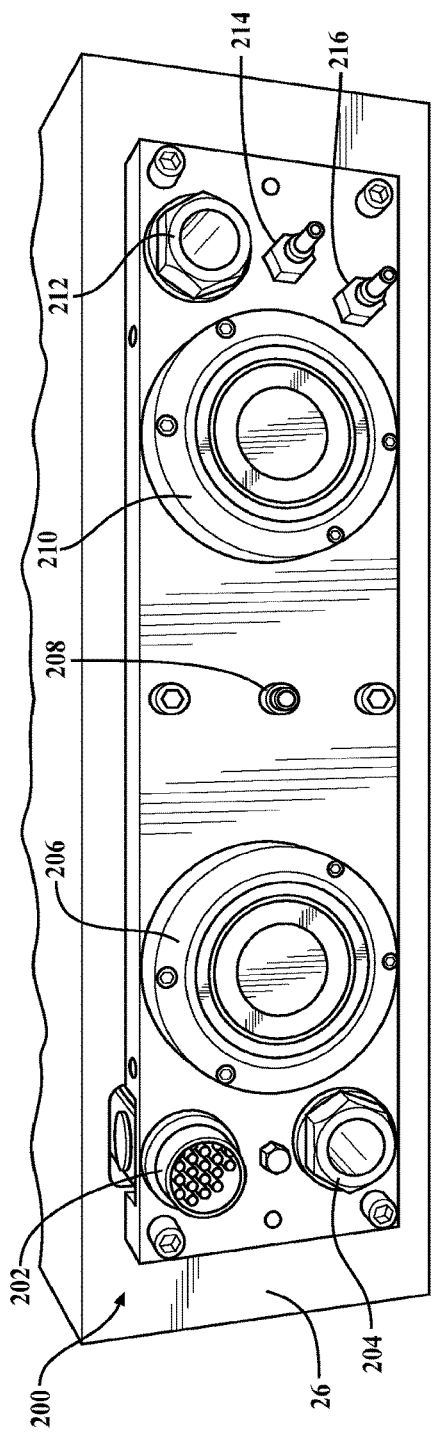
FIG. 15 is a perspective view of a tool-connection system operatively connected to the tool, with the tool-connection system including connections for feed and return of thermal fluid to and from the tubing of the tool, connections for a vacuum and static line for pressure monitoring, and a connection for a resistive thermal device (RTD) for temperature monitoring and providing feedback.

In certain embodiments, the system 20 includes a connection system for automatically coupling the press 64 and the tool 26. The connection system is useful for communicating the thermal fluid to and from the tool 26 via the system 20. Referring to FIG. 15, a tool-connection system 200 for the tool 26 is shown. The tool-connection system 200 includes a plurality of connections for connecting various elements to the tool 26, such as fluid feeds, fluid returns, and sensors. Said another way, the tool-connection system 200 can provide various services to the tool 26, and optionally, to the cavity 72 of the press 64. In general, the elements provide services and communication with the tool 26. These elements are generally in communication with the tool 26, such as being in fluid communication with the tubing 28 of the tool 26.

The tool-connection system 200 includes a resistive thermal device (RTD) male connector 202 for temperature monitoring and feedback of the tool 26. The tool-connection system 200 also includes a first alignment bushing 204, a thermal fluid intake valve 206 for feeding thermal fluid to the tool 26 from the inlet 30, a male locking pin 208, a thermal fluid exhaust valve 210 for returning the thermal fluid from the tool 26 out the outlet 32, a second alignment bushing 212, and a vacuum connector 214 and static connector 216 for pressure monitoring of the tool 26. In addition to or alternate to an RTD, other forms of temperature measurement of the tool 26 can also be utilized, such as thermocouples. These forms include thermocouples, optical pyrometers and other like systems. Certain embodiments may monitor the actual temperature or the rate of change in the temperature.

Figure 16:
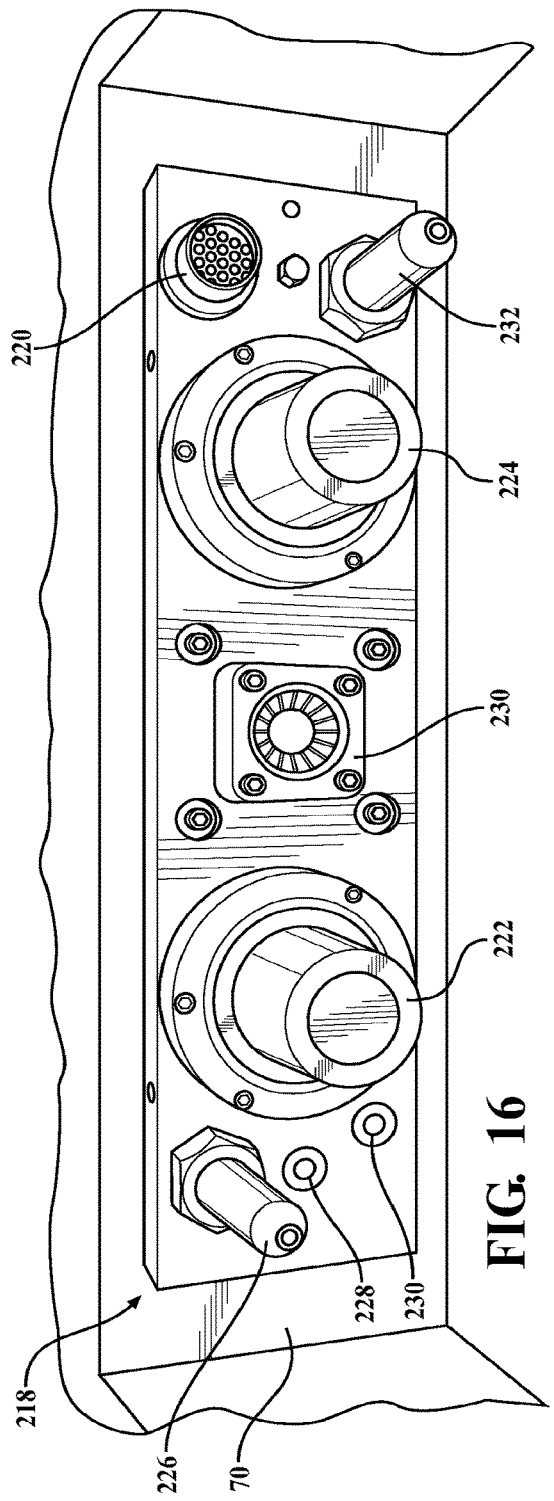
FIG. 16 is a perspective view of a press-connection system operatively connected to the cover of the press for coupling with the tool-connection system shown in FIG. 15, with the press-connection system including connections for feed and return of thermal fluid through the cover of the press and to and from the tubing of the tool, connections for a vacuum and static line for pressure monitoring, and a connection for a RTD for temperature monitoring and providing feedback.

Referring to FIG. 16, a press-connection system 218 for the press 64 is shown. The press-connection system 218 includes a plurality of connections for connecting various elements to the press 64, such as fluid feeds, fluid returns, and sensors. These elements are generally in communication with the system 20, such as being in fluid communication with the piping 38 of the system 20. The press-connection system 218 includes a RTD female connector 220 for temperature monitoring and feedback of the tool 26. The press-connection system 218 also includes a thermal fluid exhaust valve 222 for feeding thermal fluid to the tool 26 from the inlet 30, a thermal fluid intake valve 224 for returning the thermal fluid from the tool 26 out the outlet 32, a first alignment pin 226, a vacuum connector 228 and a static connector 230 for pressure monitoring of the tool 26, a female locking ring 230 operated by hydraulic actuators, and a second alignment pin 232.

Figure 17:
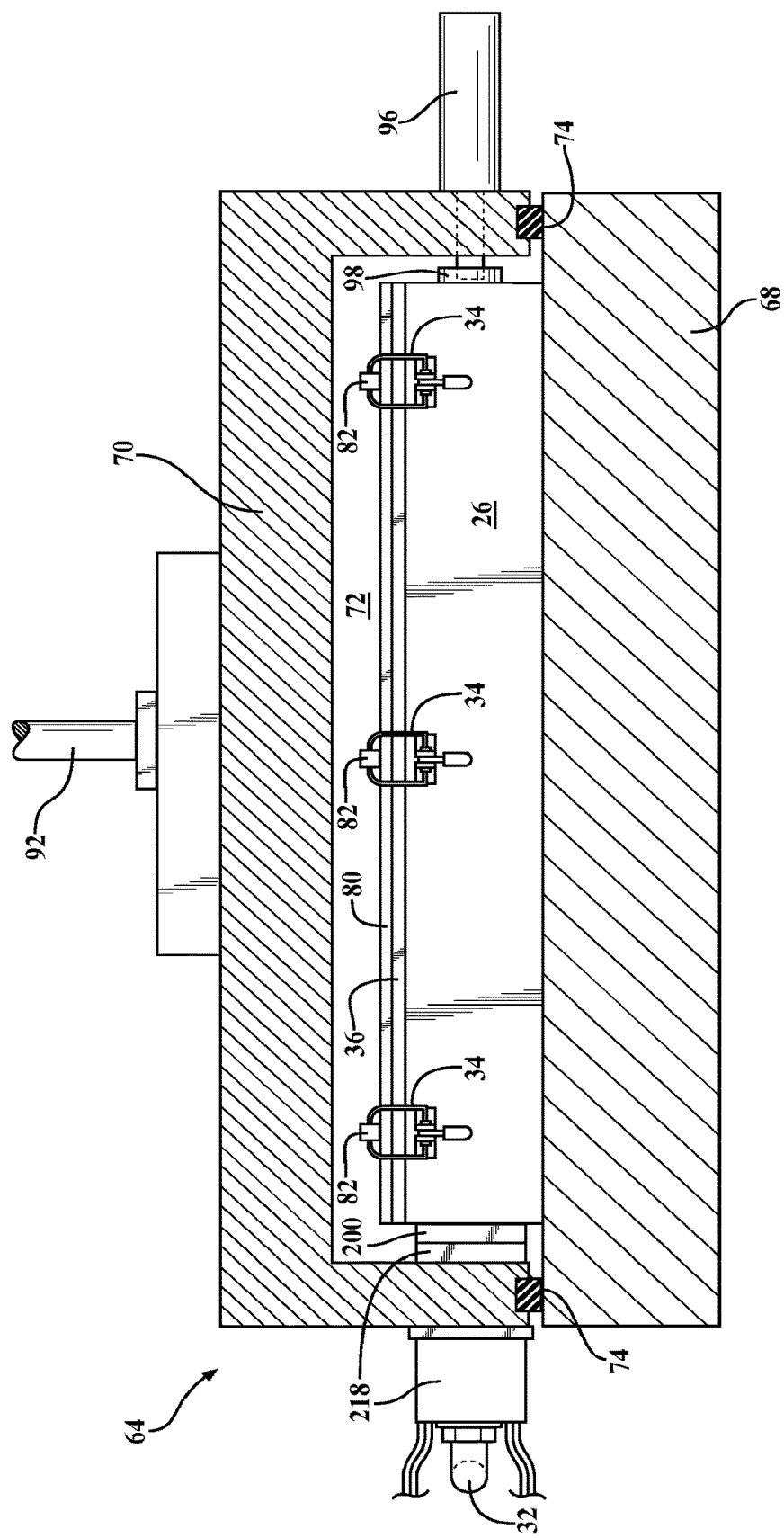
FIG. 17 is a partial cross-sectional side-view of the press having the cavity defined between the platform and the cover, with the tool-connection system and the press-connection system coupled together such that thermal fluid can be communicated to and from the tool with the thermal system.

Referring to FIG. 17, the press 64 is depicted during a press cycle to form a composite article 22. The press 64 and tool 26 have a pressure and temperature profile which is imparted in part by the press-connection system 218 and the tool-connection system 200 in combination with the system 20. Typically, connection between the tool 26 and cover 70 of the press 64 is done automatically after the cover 70 closes. Specifically, the tool-connection system 200 and the press-connection system 218 couple and engage with one another after the tool 26 enters the press 64. Typically, as like shown in FIG. 17, the rams 96 are used to push the connection systems 200,218 together. The carrier 86 can later be used to pull the connection systems 200,218 apart. Once coupled, the tool 26 and the press 64 are in fluid (and, typically, electrical communication) with one another as well as in communication with the controller 56.

In a specific embodiment, the tool-connection system 200 is operatively connected to the tool 26, and the press-connection system 218 is in fluid communication with the heater-subsystem 40 and the exchanger-subsystem 49. As described above, the connection systems 200,218 couple together for feeding and receiving the first thermal fluid to and from the tool 26. The press-connection system 218 is operatively connected to the tubing 28 of the tool 26 for heating and cooling the mold surface 26 with the first thermal fluid. The press-connection system 218 is operatively connected through the cover 70 and/or the platform 68 of the press 64 into the cavity 72 for coupling with the tool-connection system 200 while the tool 26 is disposed within the cavity 70 of the press 64 for heating and cooling the mold surface 26 with the first thermal fluid.

Such a "quick-connect/disconnect" configuration provides for manufacturing versatility, such as allowing for multiple tool 26 variations to be utilized with no affiliated change over time. For example, various configurations of tools 26 can be utilized and simply "plugged into" the press 64 via the connection systems 200,218. This also allows for a fast change out of the tools 26 in the system 20. Tool 26 changes can occur in a time frame of 5 minutes, as fast as 2 minutes and as long as 10 minutes. As a comparison, typical tool changes in compression molding of fiber reinforced plastic parts can take 4 hours.

As introduced above, operation of the system 20, including positioning of the tool 26 and the applied temperature and pressure is generally monitored and controlled by the controller 56. The controller 56 may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Returning to the method, the method further comprises the step of applying vacuum to the vacuum canopy 36 thereby evacuating the envelope to retain the preform 62 adjacent the mold surface 24 of the tool 26. This is useful for keeping the preform 62 in contact with the mold surface 24 for heating and cooling. Vacuum may be applied by various methods. For example, a vacuum pump (not shown) can be connected to the tool 26 which draws air from the mold surface 24. Typically, vacuum is tested prior to disposing the tool 26 within the cavity 72 to ensure a proper seal of the vacuum canopy 36 on the tool 26. As described above, the fasteners 34 and clasps 82 are useful for aligning the vacuum canopy 36 on the tool 26. The vacuum pump can be in fluid communication with the tool through the cover 70 and/or through the platform 68 of the press 64. Vacuum can be applied at various pressures, such as from about 10 to about 35, or about 12.5 to about 32.5, or about 15 to about 30, in Hg.

The method further comprises the step of heating the mold surface 24 of the tool 26 from $T_1$ to $T_2$ within $Tt_1$. This is useful for thinning the resin of the preform 62. $T_1$, $T_2$, and $Tt_1$ can be as described above. The system 20 can be used for heating the mold surface 24.

The method further comprises the step of pressurizing the cavity 72 of the press 64 from $P_1$ to $P_2$ within $Pt_1$. This is useful for consolidating the preform 62. $P_1$, $P_2$, and $Pt_1$ can be as described above. Typically, the method further comprises the step of providing the pressure tank 66. The pressure tank 66 is in fluid communication with the cavity 72 of the press 64 to pressurize and/or depressurize the cavity 72 of the press 64. Such fluid communication can be through the cover 70 and/or through the platform 68 of the press 64.

In certain embodiments, the gas is recycled from the cavity 72 after use. In other embodiments, the gas is vented from the cavity 72 after use, rather than being recycled. The pressure tank 66 can contain various compressed gases. Typically, the pressure tank 66 contains compressed air, such that the cavity 72 of the press 64 is pressurized with air. In certain embodiments, the pressure tank 66 is free of compressed nitrogen gas ($N_2$). It is to be appreciated that air can include ~78% $N_2$. While air is typically used to pressurize the cavity 72, other types of gases may also be used.

The pressure tank 66 may be a stand alone pressurized tank containing the compressed gas or be part of an air compressor. The pressure tank 66 and/or air compressor may be of various types. The pressure tank 66 and/or air compressor should be capable of handling and delivering the pressures associated with the cavity 72 of the press 64. For example, the pressure tank 66 should be able to pressurize the cavity 72 of the press 64 to at least 150 psig in no more than 120 seconds. Suitable pressure tanks 66 and air compressors are commercially available from a variety of suppliers. Specific examples of air compressors include those commercially available from Sullair® of Michigan City, Ind., including the Sullair® Stationary Air Power Systems, e.g. the Sullair® 2200, the Sullair® 3700, the Sullair® 4500, and the Sullair® 7500.

The pressure tank 66 can be in fluid communication with a dryer (not shown). The dryer is useful for removing moisture from the compressed gas sent to or returned from the cavity 72 of the press 64. The dryer may be of various types. Suitable dryers are commercially available from a variety of suppliers. Specific examples of dryers include those commercially available from BEKO Technologies Corp. of Atlanta, Ga., including the Drypoint® Series, e.g. the Drypoint® RA.

Typically, the method further comprises the steps of providing the system 20 and providing the controller 56 for heating and cooling of the mold surface 24 of the tool 26, as well as for pressurizing and depressurizing the cavity 72. For example, the controller 56 can be in communication with the pressure tank 66 and the press 64 with the controller 56 controlling the pressure tank 66 and/or the press 64 to pressurize or depressurize the cavity 72. The controller 56 typically measures pressure of the cavity 72 by feedback from one or more pressure sensors (not shown) disposed within the cavity 72. The controller 56 is typically programmed to set certain pressures at certain times and/or temperatures.

The method further comprises the step of maintaining the mold surface 24 of the tool 26 at about $T_2$ for $Tt_2$. This is useful for curing the resin. The method can further comprise the step of maintaining the mold surface 24 of the tool 26 at $T_{1-2}$ for $Tt_{<1}$ prior to heating the mold surface 24 of the tool 26 to $T_2$.

The method further comprises the step of maintaining the cavity 72 of the press 64 at about $P_2$ for $Pt_2$. This is useful for further consolidating and curing of the composite article 22. The method further comprises the step of cooling the mold surface 24 of the tool 26 to drop the mold surface 24 from about $T_2$ to $T_3$ within $Tt_3$. The controller 56, the system 20, and the pressure tank 66 can be used for these steps.

The method further comprises the step of depressurizing the cavity 72 of the press 64. Typically, the cavity 72 is depressurized back to $P_1$ over a third period to time ($Pt_3$). The cavity 72 of the press 64 can be depressurized at various rates. The rate of depressurizing may be linear or curvilinear. For example, the rate of depressurizing can increase at a decreasing rate, increase at an increasing rate, be substantially constant, or combinations thereof. Typically, depressurizing is at a rate of greater than about 0.1, greater than about 0.2, greater than about 0.3, greater than about 0.4, greater than about 0.5, greater than about 0.6, greater than about 0.7, greater than about 0.8, greater than about 0.9, greater than about 1, greater than about 1.1, greater than about 1.2, greater than about 1.3, greater than about 1.4, or greater than about 1.5, psi per second. In certain embodiments, the cavity 72 can be depressurized at a rate upwards of about 100, about 75, about 50, about 25, or about 10, psi per second.

$Pt_3$ can be various time periods. Typically, $Pt_3$ is short relative to previous time periods of pressurizing. However, $Pt_3$ may also be longer than or equal to one or more previous time periods of pressurizing. Typically, $Pt_3$ is from about 1 to about 25, from about 1 to about 20, from about 1 to about 15, from about 1 to about 12.5, from about 1 to about 10, from about 1 to about 7.5, from about 1 to about 5, or from about 1 to about 2, minutes. Typically, $(Pt_1+Pt_2+Pt_3) \le (Tt_1+Tt_2+Tt_3)$.

The method can further comprise the step of maintaining the cavity 72 of the press 64 at $P_{1-2}$ for $Pt_{<1}$ prior to pressurizing the cavity 72 of the press 64 to $P_2$. The method further comprises the step of separating the cover 70 and the platform 68 of the press 64. Typically, pressure in the cavity 72 is reduced prior to separating the cover 70 and platform 68 to prevent damage to the peripheral seal 74 and/or composite article 22. As alluded to the above, the pressure tank 66 can be used to depressurize the cavity 72. In addition or alternatively, the press 64 can vent the compressed gas to the atmosphere in a rapid or controlled manner. The method can further comprise the step of maintaining vacuum on the vacuum canopy 36. This is typically done while the cavity 72 of the press 64 is pressurized.

Figure 8:
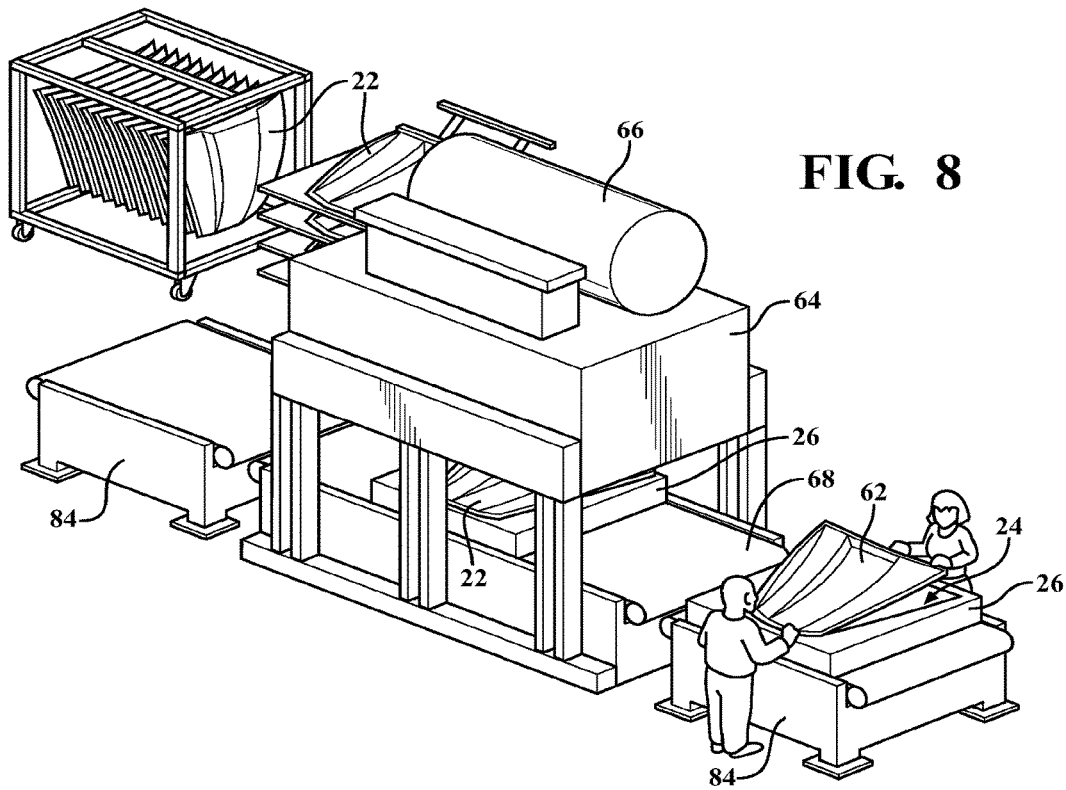
FIG. 8 is a perspective simplified environmental view of another embodiment of the press, support tables, and composite articles, with technicians disposing a preform of the composite article on a mold surface of the tool disposed on one of the support tables.

The method further comprises the step of removing the tool 26 from the press 64. The carrier 86 can be used to push or pull the tool 26 from the platform 68 back to the support table 84 or another support table 84. Referring to FIG. 8, another embodiment of the press 64 is shown. One support table 84 can be used for loading and one support table 84 can be used for unloading. In this configuration, different tools 26 can be used to load the press 64 rather than using the previously unloaded tool 26. This is not to say that a previously unloaded tool 26 cannot be loaded into the press 64 at a later time.

The method further comprises the step of removing the vacuum canopy 36 from the tool 26. The vacuum canopy 36 may be removed manually or automatically. The method further comprises the step of removing the composite article 22 from the mold surface 24 of the tool 26. The composite article 22 may be removed manually or automatically. Typically, the composite article 22 is at a temperature which can be handled by gloved (or bare) hand. The total of $Tt_1+Tt_2+Tt_3$ is as described above.

The present invention also provides a method of forming a preform 62. The method may be referred to as a layup (or lay-up) method. The preform 62 may be used with the system 20 and/or invention methods described above to form the composite article 22.

Figure 9:
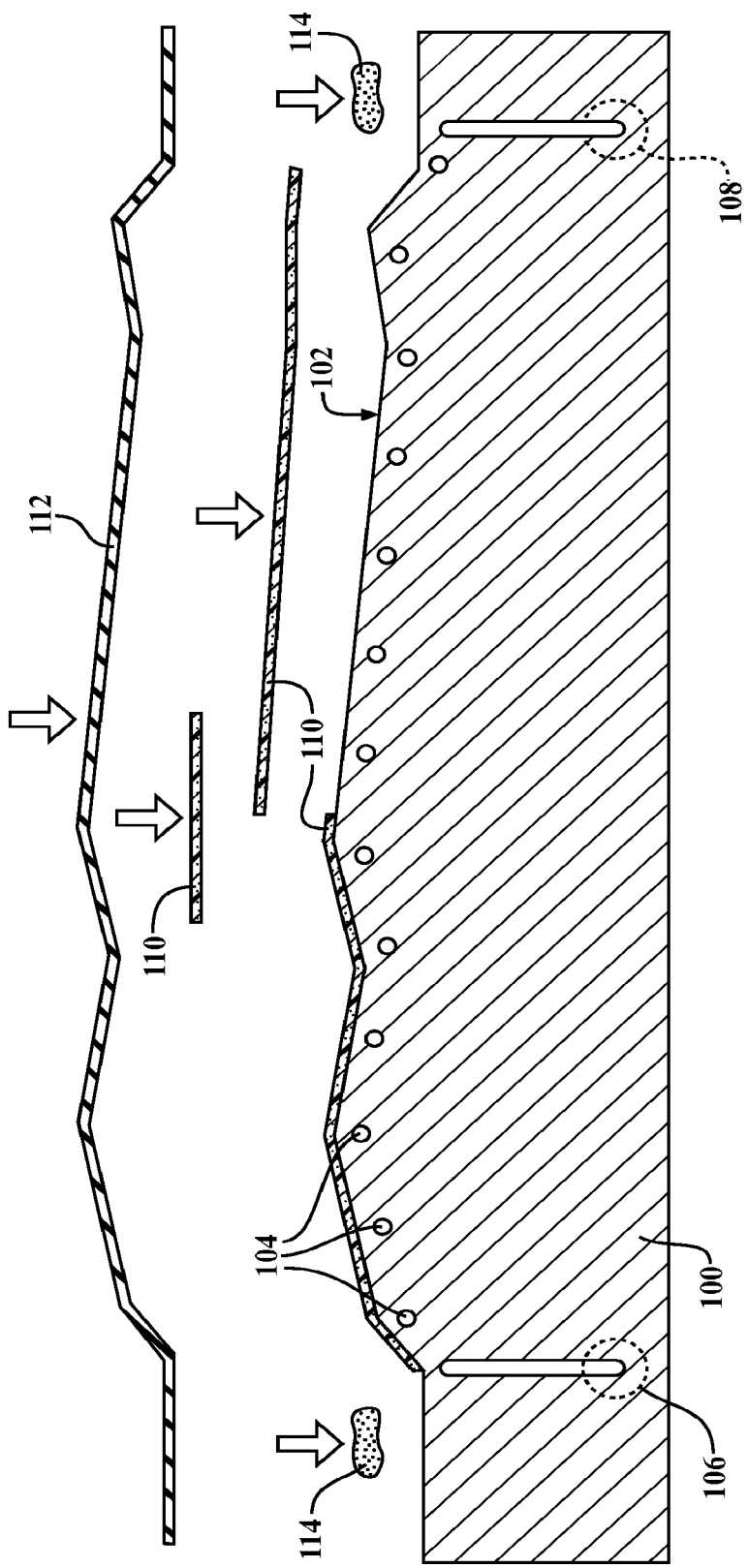
FIG. 9 is a cross-sectional side-view of a mandrel having a mandrel surface and tubing, with pieces of a carbon fiber sheet being disposed on the mandrel surface, and a vacuum sheet being disposed over the pieces on the mandrel surface.

Referring to FIG. 9, the method comprises the step of providing a mandrel 100 having a mandrel surface 102. Various types of mandrels 100 can be employed. Suitable mandrels 100 are commercially available from a variety of suppliers. Specific examples of mandrels 100 include those commercially available from Models & Tools Inc.

Typically, the mandrel surface 102 of the mandrel 100 is complimentary to the mold surface 24 of the tool 26. For example, the surfaces 24, 102 may be in a female/male configuration. The mandrel 100 can be similar to the tool 26. For example, the mandrel can have tubing 104 for conveying a fluid.

The tubing 104 includes at least one input 106 for communicating fluid to the tubing 104 and at least one outlet 108 for communicating fluid from the tubing 104. The tubing 104 is proximal or directly in contact with the mandrel surface 102 to expedite heat transfer. The tubing 104 is useful for direct (rather than indirect) heating or cooling of the mandrel surface 102. The tubing 104 may be formed into the mandrel 100 itself (such as by boring), or attached within the mandrel 100 proximal the mold surface 24, either to the tool 26 and/or to the mold surface 24. The tubing 104 can be arranged in various patterns and may be of equal or varying diameters, as like described above for the tool 26.

The tubing 104 of the mandrel 100 is connected to piping (not shown) for communicating the fluid to and from the mandrel 100. The mandrel 100 can be in fluid communication with the system 20 for heating or cooling the mandrel surface 102. Alternatively, the mandrel 100 can be in fluid communication with another type of system (not shown), such as a conventional oil- or water-based heating and/or cooling system, typically a water-based system.

The method further comprises the steps of providing pieces of a carbon fiber sheet 110 and providing the resin. The pieces of carbon fiber sheet 110 can be of various types, such as pieces 110 comprising the pre-pregs and/or carbon fiber mats described above. The resin can be of various types, such as the epoxies described above. The resin has a "tack" temperature, which is described further below.

The method further comprises the step of heating the mandrel surface 102 to a first temperature. The first temperature promotes adhesion of the resin to the mandrel surface 102 during preparation of the preform 62. The first temperature generally corresponds to the tack temperature of the resin, where the resin adheres to both the mandrel surface 102 and to itself, such as adhesion between layers of the pieces 110.

The tack temperature can be determined via testing or by reference to technical literature of the resin, such as from MSDS or technical data sheets. A typical test for determining tack involves placing a gloved finger or tool on a layer of the resin, and pulling the finger or tool away to determine at which point in temperature the resin adheres to the finger or tool when pulled away. The first temperature is typically of from about 100 to about 175, from about 110 to about 155, or from about 125 to about 140, ° F. (~38 to ~79, ~43 to ~68, or ~52 to ~60, ° C.).

The method typically comprises the step of applying the resin to the mandrel surface 102 of the mandrel 100 to form a resin layer (not shown). The resin may be applied by various methods. For example, the resin may be applied by hand or robotic spraying, brushing, pouring, rolling, etc. Prior to applying the resin, a release liner or coating may be applied to the mandrel surface 102 to prevent sticking of the preform 62.

The method further comprises the step of arranging the pieces 110 on the resin layer to form a carbon fiber mat. The pieces 110 may be laid in a uniform layer and/or may overlap one another. Multiple layers of the pieces 110 can be arranged to build up thickness of the carbon fiber mat, and optionally, additional resin can be applied between the layers of the pieces 110. The method typically comprises the step of applying additional resin on top of the carbon fiber mat.

The method further comprises the step of disposing a vacuum sheet 112 on the mandrel 100 to define an envelope (not shown) between the vacuum sheet 112 and the mandrel surface 102 of the mandrel 100. Typically, putty 114 is applied around a periphery of the mandrel 100 for making the envelope airtight. The putty 114 may be applied by various methods, such as by hand, robotic dispenser, etc. A release liner or coating may be applied between the vacuum sheet 112 and the preform 62 to prevent sticking. Rather than using the putty 114, the vacuum sheet 112 may be configured similar to or the same as the vacuum sheet 36 described above with the tool 26. In other words, the vacuum sheet 112 may include a peripheral seal (not shown).

The method further comprises the step of applying vacuum to the vacuum sheet 112 thereby evacuating the envelope to retain the preform 62 adjacent the mandrel surface 102 of the mandrel 100. This is useful for consolidating the pieces 110 and further form the preform 62. This is also useful for keeping the preform 62 in contact with the mandrel surface 102 during heating and cooling. Vacuum can be applied at various pressures, such as from about 10 to about 35, from about 12.5 to about 32.5, or from about 15 to about 30, inches Hg.

The method further comprises the step of cooling the mandrel surface 102 to a second temperature. The second temperature allows the preform 62 to be released from the mandrel surface 102. The second temperature is typically cooler than the first temperature, and generally corresponds to either a non-tack or less tacky temperature of the resin. The second temperature is typically from about 35 to about 100, about 40 to about 75, or about 40 to about 50, ° F. (~1.7 to ~38, ~4 to ~24, or ~4 to ~10, ° C.). Heating and cooling of the mandrel surface 102 can be controlled manually, or automatically, such as by another controller (not shown). The method further comprises the steps of removing the vacuum sheet 112 from the mandrel 100 and removing the removing the preform 62 from the mandrel surface 102. These steps can be manual or automatic.

In certain embodiments, the mandrel 100 can be attached to a manual or robotic arm (not shown), such that the mandrel 100 can be movable from a preparation position to a molding position. For example, in the preparation position, the preform 62 is formed on the mandrel 100, with the mandrel surface 102 set at the first temperature to hold the preform 62 in place. After the preform 62 is formed, the mandrel 100 can then move to the molding position, where the temperature of the mandrel surface 102 is set to the second temperature, thereby allowing release of the preform 62 from the mandrel surface 102. The preform 62 can then be disposed on the mold surface 24 of the tool 26 for further processing, such as directly moving or dropping the preform 62 from the mandrel 100 onto the mold surface 24. Alternatively, the preform 62 can be stored or queued for later use in either the same or a different location.

Figure 10:
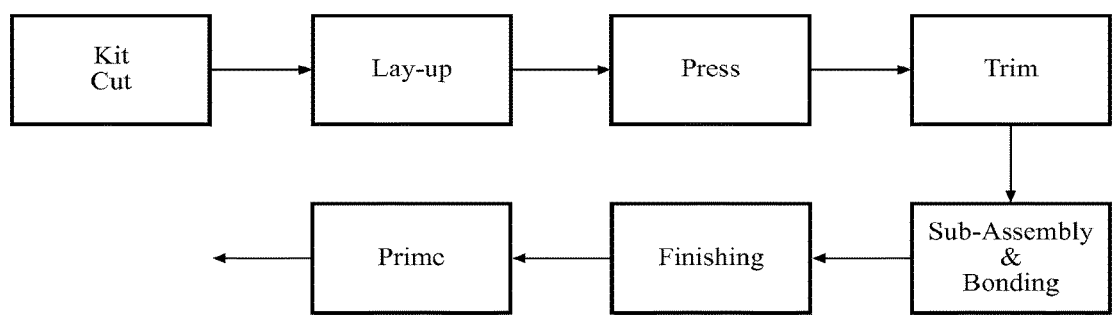
FIG. 10 is a flow chart generally illustrating additional, optional, manufacturing steps for forming the composite article.

Referring to FIG. 10, various steps (or processes) may be carried out before and/or after formation of the composite article 22 in the press 64. These steps can be used in various orders and combinations. These additional steps are merely examples, and are not to be construed as limitations of the present invention.

The pieces 110 for the preform 62 can be provided by a "kit cut" process. For example, a pre-preg sheet can be cut into the pieces 110 using computer driven cutting tables, which use data from a computer aided drafting (CAD) system and/or from digitized patterns and drawings. For precise cutting, the kit cut process may utilize a computer numerically controlled (CNC) work cell, which includes of a series of CNC and machining tools. Patterns and molds can be made on-site, but may also be supplemented by $3^{rd}$ parties, if needed. Similar to other raw materials, the pieces 110 can be cold stored in a freezer to preserve them in advance of a lay-up process.

The pieces 110 can be used to form preforms 62 with the mandrel 100 as described above. While automation is possible, the use of hand lay-up generally allows for designing composite articles 22 with different strength requirements throughout the composite article 22 by laying down a kit of the pieces 110 that is unique to each mandrel 100. In addition, hand lay-up can reduce material cost by eliminating unnecessary extra build-up of the resin.

After formation of the composite articles 22 via the press 64 and after removal from the tool 24, they can be provided to a trim process. The composite articles 22 may be mechanically trimmed and/or drilled by a robotic router. The use of the robotic router facilitates consistent accuracy as well as timely turnaround. The composite articles 22 may then be provided to a sub-assembly and bonding process. Composite articles 22 that may require bonding are prepped following the trim process and placed in a bonding cell where they are CNC bonded. The use of a robotic bonding cell provides a consistent adhesive path for bond accuracy as well as quick turnaround.

The composite articles 22 may then be provided to a finishing process. Here, the composite articles 22 can be robotically or hand sanded. It is believed that while automated technology can streamline the finishing process, use of hand sanding helps to ensure Class A surface quality, if desired. Technicians identify and repair minor surface blemishes of the composite articles 22, if present. The composite articles 22 may then be provided to a prime process. The composite articles 22 can enter a paint line system for a high volume low pressure (HVLP) primer (or clear coat) application. The composite articles 22 may be washed prior to prevent contamination. Composite articles 22 having exposed carbon fiber weave can be clear coated and shipped directly to a customer, while composite articles 22 which require color can be primed and may be sent to a $3^{rd}$ party, e.g. an OEM approved supplier, to be painted before reaching a customer. The composite articles 22 may then be provided to a final inspection process. The composite articles 22 can be gauged and visually inspected to ensure dimensional quality. Clear coated composite articles 22 can be provided to a finesse stage where they are polished to a jewel like finish before a final visual inspection prior to shipment to the customer.

The composite articles 22 formed from the invention methods have excellent mechanical properties and/or surface properties. For example, the composite articles 22 can have near Class A surfaces, with little to no surface blemishes relative to composite articles formed via conventional autoclaving methods. More specifics of the composite articles 22 are described in the examples immediately below.

Additional embodiments, aspects, and benefits of the present invention may be appreciated with reference to the disclosures of: U.S. Provisional Patent Application Ser. No. 61/410,753, entitled "METHOD OF MAKING COMPOSITE PARTS BY USING MEMBRANE PRESS"; U.S. Provisional Patent Application Ser. No. 61/495,661, entitled "RAPID CURE SYSTEM FOR THE MANUFACTURE OF COMPOSITE PARTS"; U.S. Provisional Patent Application Ser. No. 61/418,521, entitled "SYSTEMS AND METHODS FOR FORMING COMPOSITE COMPONENTS"; International Application No. PCT/US2011/059434, entitled "THERMAL PROCESSING AND CONSOLIDATION SYSTEM AND METHOD"; and International Application No. PCT/US2011/062836, entitled "METHOD AND SYSTEM FOR FORMING COMPOSITE ARTICLES"; all of which are incorporated herein by reference in their entirety to the extent they do not conflict with the general scope of the present invention.

The following examples, illustrating the system 20, methods, and composite articles 22 of the present invention, are intended to illustrate and not to limit the invention.

EXAMPLES

Comparative examples of composites articles are made by using a conventional autoclave and autoclaving method. Invention examples of composites articles are made by using and the system and method of the present invention. Additional information regarding these examples is provided in Table I below and the subsequent description.

TABLE I

| | Example No.: | |
|---|---|---|
| | Comparative Example | Invention Example |
| Preform | | |
| Carbon Fiber Mat No.: | 1 | 1 |
| Resin No: | 1 | 1 |
| Tool No.: | 1 | 1 |
| Curing Method: | Autoclave | System (20) + Press (64) |
| Heat Ramp Rate: | ~5° F./min (~2.8° C./min) | ~180° F./min (~100° C./min) |
| Pressurize Ramp Rate: | ~0.15 psi/sec (~1 kPa/sec) | ~1 psi/sec (~7 kPa/sec) |
| Depressurize Ramp Rate: | ~0.3 psi/sec (~2 kPa/sec) | ~1 psi/sec (~7 kPa/sec) |
| Total Cycle Time: | 72 mins | 13 mins |
| Temperature of Tool: (after Total Cycle Time) | ~180° F. (~82° C.) | ~120° F. (~49° C.) |
| Energy use in "X" units | ~2X | X |
| Operating Costs in "X" units | ~5X | X |

The preforms are formed by conventional lay-up methods. The preforms are shaped into car hoods. The carbon fiber mat is an exposed weave pre-preg, and the resin is a "quick cure" epoxy resin, which are both commercially available from Toray Composites (America), Inc. of Tacoma, Wash.

The preforms are loaded into tool and covered with a vacuum sheet. The tools are the same in configuration and material. Vacuum is established and confirmed. The tools are disposed into the autoclave or press, respectively. The autoclave is closed and the started. The press is closed and started. The press is in fluid communication with the invention system.

Figure 14:
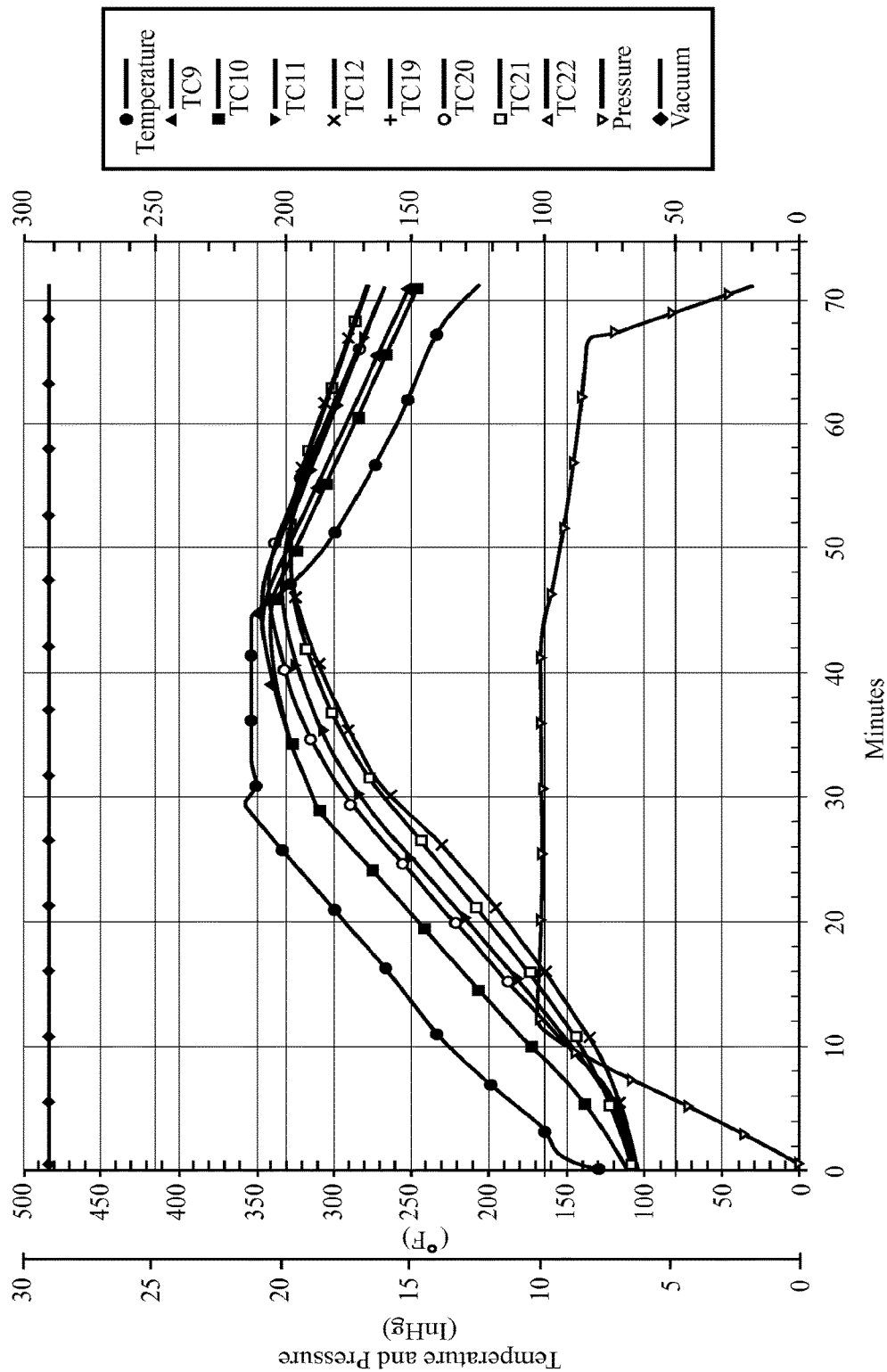
FIG. 14 is a graph illustrating temperature, pressure, vacuum and heater profiles over time for a comparative example of a composite article using a conventional autoclave.

Referring to FIG. 14, specific parameters including temperature and pressure ramps and dwells for the autoclave can be better appreciated. Each of the TCs in FIG. 14 refers to a temperature at a specific point on the mold surface of the tool. As can be appreciated, the autoclave fails to uniformly heat the mold surface at constant temperatures. It is believed that this lack of uniform heat soaking imparts the composite articles formed in the autoclave with various problems, such as surface blemishes. Referring to FIG. 11, specific parameters including temperature and pressure ramps and dwells for the press can be better appreciated.

FIG. 12 illustrates a second invention example (not shown in Table I above). FIG. 13 illustrates a third invention example (also not shown in Table I above). As can be appreciated with reference to FIGS. 12 and 13, the invention system is capable of rapidly heating the mold surface in a short period of time. In addition, a dwell is not required to reach a peak temperature. Instead, the peak temperature can be quickly reached within a very short period of initial time based on the rapid heating capability of the invention system.

Referring to FIG. 11, temperature of the mold surface of the tool ramps from $T_1$ to $T_{1-2}$ using the heater-subsystem and controller. Specifically, the controller directs a portion of the mass of heated fluid from the tank of the heater-subsystem to the tool using the valves until $T_{1-2}$ is reached.

Once $T_{1-2}$ is reached, the controller stops flow from the tank by using the valves and the heater-subsystem begins to re-circulate to recharge the mass of heated fluid. $T_{1-2}$ is maintained at an acceptable tolerance level by the controller modulating additional flow of the mass of heated fluid to the tool, as needed. During $Tt_{<1}$, it is believed that the resin is at or near its lowest viscosity. Having the resin at such a viscosity allows any trapped air or resin byproducts created during cure of the resin (e.g. steam) to evacuate from the composite article.

While the tool is being heated to temperature $T_{1-2}$, the cavity of the press is pressurized to $P_{1-2}$. Specifically, the controller directs the pressure tank to provide compressed air to the cavity. Once $P_{i-2}$ is reached, the controller stops flow from the pressure tank. $P_{1-2}$ is maintained at an acceptable tolerance level by the controller modulating additional flow of compressed air to the cavity, as needed.

Once $Tt_{<1}$ passes, the controller directs another portion (or all of) the mass of heated fluid to the tool until the mold surfaces reaches $T_2$. Once $T_2$ is reached, the controller stops flow from the tank by using the valves and the heater-subsystem begins to re-circulate to recharge the mass of heated fluid. $T_2$ is maintained at an acceptable tolerance level by the controller modulating additional flow of the mass of heated fluid to the tool, as needed. During $Tt_2$, it is believed that the resin is at or near its cure temperature. It is believed that having the resin at such a temperature imparts the composite article with excellent surface and mechanical properties. This temperature can be determined via testing or by reference to technical literature of the resin, such as from MSDS or technical data sheets.

While the tool is being heated to temperature $T_2$, the cavity of the press is pressurized to $P_2$. Specifically, the controller directs the pressure tank to provide compressed air to the cavity. Vacuum is maintained while pressure is applied. Once $P_2$ is reached, the controller stops flow from the pressure tank. $P_2$ is maintained at an acceptable tolerance level by the controller modulating additional flow of compressed air to the cavity, as needed. Once $Pt_2$ passes, the controller directs the press to depressurize. Specifically, the press begins to vent the compressed air to the atmosphere over $Pt_3$. The press may do a complete "dump" of the air, i.e., air does not need to be released at a controlled rate.

In certain examples utilizing systems as depicted in FIG. 2, once $Tt_2$ passes, the controller directs a portion of the mass of cooled fluid from the tank of the chiller-subsystem to the tool using the valves until $T_3$ is reached. Prior to or while the heater-subsystem was previously being used, the controller directed the chiller-subsystem to form and maintain the mass of cooled fluid using the valves, tank, and chiller. While the chiller-subsystem is being used, the controller directs the heater-subsystem to recharge and maintain the mass of heated fluid using the valves, tank, and heater. As such, the system is ready for a subsequent cycle immediately after a short period of time.

In other examples utilizing systems as depicted in FIG. 18, once $Tt_2$ passes, the controller directs a portion of the mass of cooled fluid from the tank of the chiller-subsystem to the exchanger-subsystem using the valves until $T_3$ is reached. Prior to or while the heater-subsystem was previously being used, the controller directed the chiller-subsystem to form and maintain the mass of cooled fluid using the valves, tank, and chiller. While the chiller-subsystem is being used, the controller directs the heater-subsystem to recharge and maintain the mass of heated fluid using the valves, tank, and heater. As such, the system is ready for a subsequent cycle immediately after a short period of time.

After each of the cycles is complete, the tools are removed from the autoclave and press. Performance of each cycle is evaluated on an appearance basis of the composite articles formed via each method. Specifically, the composite articles are removed from the tools and their surfaces are wiped with white talcum powder to highlight surface blemishes. Pits and/or dry-lines present on the surface of the composite articles are highlighted by the talcum powder. Specifically, such defects are seen as white dots (pits) or white streaks (dry-lines). A pit or dry-line is where the resin has not properly flowed during the cycle thereby leaving a void on the surface.

The composite articles made by the invention system and method have excellent surface properties relative to those made by the autoclave. Specifically, the composite articles formed via the invention system and method have an ~85 to 90% reduction in the amount of pits and dry-lines relative to those formed in the autoclave. In addition, the composite articles formed via the invention system and method have an ~85% to 90% reduction in the severity (depth/width) of pits and dry-lines relative to those formed in the autoclave. Such defects have to be repaired (filled and sanded) in order for the surface of the composite article to be considered Class A.

Referring back to Table I above, the invention system and method also has over an ~80% reduction in cycle time relative to the autoclave process (13 mins vs. 72 mins). In addition, the tools are over 30% cooler in temperature after being removed from the press relative to those removed from the autoclave: ~120° F. (~49° C.) vs. ~180° F. (~82° C.). As such, the invention system and method allows for a significant reduction in cycle time and overall manufacturing time while providing higher quality composite articles, as compared to those formed using the autoclave.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both singly and multiply dependent, is herein expressly contemplated.

What is claimed is:

1. A method of rapidly heating and cooling a mold surface of a tool used for forming a composite article, said method comprising the steps of: providing a heater-subsystem in fluid communication with the tool and comprising; a heater for heating a first thermal fluid, a heater-subsystem tank in fluid communication with the heater and containing a mass of heated first thermal fluid, and a three-way valve in fluid communication i) between the heater-subsystem tank and the heater for re-circulating the first thermal fluid from the heater-subsystem tank to the heater and ii) between the heater-subsystem tank and the tool for directing the first thermal fluid from the heater-subsystem tank to the tool; providing an exchanger-subsystem in fluid communication with the heater-subsystem and the tool and comprising; an exchanger for cooling the first thermal fluid returning from the tool, and a three-way valve in fluid communication i) between the exchanger and the heater-subsystem for sending the first thermal fluid from the tool back to the heater-subsystem and ii) between the exchanger and the tool for directing the first thermal fluid from the tool to the exchanger; and providing a chiller-subsystem in fluid communication with the exchanger-subsystem and comprising; a chiller to cool a second thermal fluid, a chiller-subsystem tank in fluid communication with the chiller and containing a mass of cooled second thermal fluid, and a three-way valve in fluid communication i) between the chiller-subsystem tank and the chiller for re-circulating the second thermal fluid from the chiller-subsystem tank to the chiller and ii) between the chiller-subsystem tank and the exchanger-subsystem for directing the second thermal fluid from the chiller-subsystem tank to the exchanger; providing a controller in communication with the tool and the subsystems for instructing the subsystems; directing the mass of heated first thermal fluid from the heater-subsystem tank of the heater-subsystem to the tool via the controller to heat the mold surface of the tool from a first temperature ($T_1$) to a second temperature ($T_2$) within a first period of time ($T_1$); directing the mass of heated first thermal fluid from the heater-subsystem tank of the heater-subsystem to the mold surface of the tool via the controller to maintain the mold surface at $T_2$ for a second period of time ($T_2$); directing the mass of cooled second thermal fluid from the chiller-subsystem tank of the chiller-subsystem to the exchanger-subsystem via the controller; and directing the mass of first thermal fluid via the controller from the exchanger subsystem through a flow path disposed between the exchanger-subsystem and the tool without passing through the heater-subsystem to cool the mold surface of the tool from $T_2$ to a third temperature ($T_3$) within a third period of time (Tt $_3$); wherein the mold surface of the tool heats at a rate of greater than about 33° C. per minute (60° F./min) and cools at a rate of greater than about 22° C. per minute (40° F./min); and wherein $Tt_1 + Tt_2 + Tt_3$ is no greater than 20 minutes.

2. The method as set forth in claim 1, wherein the controller instructs the three-way valve of the heater-subsystem such that the first thermal fluid: i) re-circulates between the heater and the heater-subsystem tank and bypasses the tool to maintain the mass of heated first thermal fluid in the heater-subsystem at a temperature of $T_2$ or higher; or ii) is directed from the heater-subsystem to the tool to heat the mold surface of the tool from $T_1$ to $T_2$.

3. The method as set forth in claim 1 wherein the controller instructs the three-way valve of the chiller-subsystem such that the second thermal fluid: i) re-circulates between the chiller and the chiller-subsystem tank and bypasses the exchanger-subsystem to maintain the mass of cooled second thermal fluid in the chiller-subsystem at a temperature of $T_3$ or lower; or ii) is directed from the chiller-subsystem to the exchanger-subsystem to cool the first thermal fluid returning from the tool and entering the exchanger-subsystem to a temperature lower than $T_2$.

4. The method as set forth in claim 1 wherein the controller instructs the three-way valve of the exchanger-subsystem such that the first thermal fluid returning from the tool is directed to: i) the heater-subsystem and bypasses the exchanger-subsystem to reheat the first thermal fluid within the heater-subsystem to a temperature of $T_2$ or higher; or ii) the exchanger-subsystem to cool the first thermal fluid via the second thermal fluid from the chiller -subsystem to a temperature lower than $T_2$.

5. The method as set forth in claim 1 further comprising the step of maintaining the mold surface of the tool at an intermediate temperature ($T_{1-2}$) of between $T_1$ and $T_2$ via the controller for a portion of $Tt_1$ ($Tt_{<1}$) prior to heating the mold surface of the tool to $T_2$.

6. The method as set forth in claim 5 wherein: i) $T_{1-2}$ is from about 38° C. (100° F.) to about 177° C. (350° F.); ii) $Tt_{<1}$ is from 1 to less than 10 minutes; or iii) both i) and ii).

7. The method as set forth in claim 1 wherein: i) $T_1$ is from about 10° C. (50° F.) to about 52° C. (125° F.); and/or ii) $T_2$ is from about 121° C. (250° F.) to about 204° C. (400° F.); and/or iii) $T_3$ is from about 24° C. (75° F.) to about 66° C. (150° F.).

8. The method as set forth in claim 1 wherein $Tt_1$ is from 1 to 10 minutes, $Tt_2$ is from 1 to 10 minutes, and $Tt_3$ is from 1 to 10 minutes, provided that $Tt_1 + Tt_2 + Tt_3$ is no greater than 20 minutes.

9. The method as set forth in claim 1 wherein: i) the mass of heated first thermal fluid in the heater-subsystem tank of the heater-subsystem is at a temperature of $T_2$ or higher for heating the mold surface of the tool with the mass of heated fluid; ii) the mass of cooled second thermal fluid in the chiller-subsystem tank of the chiller-subsystem is at a temperature of $T_3$ or lower for cooling the mold surface of the tool; or iii) both i) and ii).

10. The method as set forth in claim 1 wherein said flow path further comprises a valve.

11. The method as set forth in claim 10 wherein said valve further comprises a check valve.

* * * * *